(12) United States Patent
Kashima et al.

(10) Patent No.: US 7,131,407 B2
(45) Date of Patent: Nov. 7, 2006

(54) VALVE OPERATING SYSTEM FOR INTERNAL COMBUSTION ENGINE

(75) Inventors: Soji Kashima, Saitama (JP); Shosaku Chiba, Saitama (JP); Yoshikazu Yamada, Saitama (JP); Hibiki Koga, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 50 days.

(21) Appl. No.: 11/034,957

(22) Filed: Jan. 14, 2005

(65) Prior Publication Data

US 2005/0178370 A1 Aug. 18, 2005

(30) Foreign Application Priority Data

Jan. 26, 2004 (JP) ............................. 2004-016953
May 21, 2004 (JP) ............................. 2004-152424

(51) Int. Cl.
*F01L 1/00* (2006.01)
*F01L 13/08* (2006.01)

(52) U.S. Cl. .................................. 123/90.1; 123/182.1
(58) Field of Classification Search ............... 123/90.1, 123/90.15, 90.16, 182.1
See application file for complete search history.

(56) References Cited

U.S. PATENT DOCUMENTS

| | | | |
|---|---|---|---|
| 6,499,451 B1* | 12/2002 | Hendriksma et al. | 123/90.16 |
| 6,718,929 B1* | 4/2004 | Onozawa et al. | 123/182.1 |
| 6,796,294 B1* | 9/2004 | Tsubouchi | 123/508 |
| 6,973,906 B1* | 12/2005 | Yoshida et al. | 123/182.1 |
| 2003/0188707 A1* | 10/2003 | Takada et al. | 123/182.1 |
| 2003/0217715 A1* | 11/2003 | Pierik | 123/90.16 |
| 2004/0139939 A1* | 7/2004 | Tsubouchi | 123/182.1 |

FOREIGN PATENT DOCUMENTS

JP 55-137245 5/1954

* cited by examiner

*Primary Examiner*—John T. Kwon
(74) *Attorney, Agent, or Firm*—Arent Fox PLLC

(57) ABSTRACT

A valve operating system includes: a decompression cam member that is provided on a camshaft, and moves between an operative position C where an exhaust tappet is operated in a valve opening direction in a compression stroke and an inoperative position D where the exhaust tappet is released; an exhaust gas recirculation cam member that is provided on the camshaft, and moves between an inoperative position F where the exhaust tappet is released and an operative position G where the exhaust tappet is operated in a valve opening direction in an intake stroke of the engine; and a common centrifugal mechanism that is driven by the camshaft to operate the decompression cam member to the operative position C in a starting rotation region of the engine and to the inoperative position D after the starting, and operate the exhaust gas recirculation cam member to the inoperative position F in a low speed operation region of the engine and to the operative position G in a high-speed operation region. Thus, the valve operating system can exert both a decompression function and an exhaust gas recirculation function.

4 Claims, 24 Drawing Sheets

STATE OF Ne < Ne1

DECOMPRESSION STATE (Ne<Ne1)

DECOMPRESSION RELEASE STATE (Ne>Ne1)

EXHAUST GAS RECIRCULATION STOP STATE (Ne < Ne2)

EXHAUST GAS RECIRCULATION STATE (Ne>Ne2)

STATE OF Ne < Ne1

DECOMPRESSION STATE (Ne<Ne1)

DECOMPRESSION RELEASE STATE (Ne>Ne1)

EXHAUST GAS RECIRCULATION STOP STATE (Ne<Ne2)

EXHAUST GAS RECIRCULATION STATE (Ne > Ne2)

STATE OF Ne < Ne1

DECOMPRESSION STATE (Ne<Ne1)

DECOMPRESSION RELEASE STATE (Ne>Ne1)

EXHAUST GAS RECIRCULATION STOP STATE (Ne < Ne2)

EXHAUST GAS RECIRCULATION STATE (Ne > Ne2)

VALVE OPERATING SYSTEM FOR INTERNAL COMBUSTION ENGINE

RELATED APPLICATION DATA

The Japanese priority application Nos. 2004-16953 and 2004-152424 upon which the present application is based are hereby incorporated in their entirety herein by reference.

BACKGROUND OF THE INVENTION

1. Field of the Invention

The present invention relates to a valve operating system for an internal combustion engine including a camshaft interlocked with a crankshaft, and an intake cam follower member and an exhaust cam follower member that are driven by an intake cam and an exhaust cam formed on the camshaft to open and close an intake valve and an exhaust valve, respectively. More particularly, the present invention relates to a valve operating system for an internal combustion engine that uses the exhaust valve to exert a decompression function at starting and exert an exhaust gas recirculation function during high speed operation.

2. Description of the Related Art

Japanese Utility Model Application Laid-Open No. 55-137245 discloses a valve operating system for an internal combustion engine that slightly opens an exhaust valve in an intake stroke to recirculate an exhaust gas into a combustion chamber, thereby preventing an excessive increase in an exhaust gas temperature to prevent generation of NOx during high speed operation of the engine.

The conventional valve operating system can exert an exhaust gas recirculation function, but has no decompression function that slightly opens the exhaust valve in a compression stroke to appropriately reduce a cylinder pressure thereby reducing a starting operation load at starting of the engine.

SUMMARY OF THE INVENTION

The invention has an object to provide a valve operating system for an internal combustion engine that can exert both a decompression function and an exhaust gas recirculation function.

In order to achieve the above described object, according to a first feature of the present invention, there is provided a valve operating system for an internal combustion engine including: a camshaft interlocked with a crankshaft; and an intake cam follower member and an exhaust cam follower member that follow an intake cam and an exhaust cam formed on the camshaft to open and close an intake valve and an exhaust valve, respectively, wherein the valve operating system further includes: a decompression cam member that is provided on the camshaft, and moves between an operative position where the exhaust cam follower member is operated in an opening direction of the exhaust valve in a compression stroke of the engine and an inoperative position where the exhaust cam follower member is released; an exhaust gas recirculation cam member that is provided on the camshaft, and moves between an inoperative position where the exhaust cam follower member is released and an operative position where the exhaust cam follower member is operated in an opening direction of the exhaust valve in an intake stroke of the engine; and a common centrifugal mechanism that is driven by the camshaft to operate the decompression cam member to the operative position in a starting rotation region of the engine and to the inoperative position after the starting, and operate the exhaust gas recirculation cam member to the inoperative position in a low speed operation region of the engine and to the operative position in a high speed operation region.

The intake cam follower member and the exhaust cam follower member correspond to an intake tappet and an exhaust tappet, respectively, in embodiments of the invention which will be described later.

In addition to the first feature, according to a second feature of the present invention, the centrifugal mechanism includes: a centrifugal weight that is radially oscillably axis-supported on a support member secured to the camshaft; a return spring that urges the centrifugal weight radially inward; and a common drive member that operates according to oscillation of the centrifugal weight, and engages cams provided on the decompression cam member and the exhaust gas recirculation cam member to drive the decompression cam member to the operative position in the starting rotation region of the engine and to the inoperative position after the starting, and drive the exhaust gas recirculation cam member to the inoperative position in the low speed operation region of the engine and to the operative position in the high speed operation region.

The support member and the drive member correspond to a driven gear 32 and a drive ring 45, respectively, in the embodiments of the invention which will be described later.

In addition to the second feature, according to a third feature of the present invention, the return spring includes: a first return spring that always exerts a radially inward urging force on the centrifugal weight; and a second return spring that exerts a radially inward repulsive force on the centrifugal weight after the centrifugal weight oscillates radially outward through a predetermined angle or more.

In addition to the second feature, according to a fourth feature of the present invention, the centrifugal weight includes: a first centrifugal weight that always exerts a centrifugal force against an urging force of the return spring during rotation of the camshaft; and a second centrifugal weight that is integrated with the first centrifugal weight to exert the centrifugal force against the urging force of the return spring before the first centrifugal weight oscillates radially outward through a predetermined angle, but is separated from the first centrifugal weight to cancel the centrifugal force against the urging force of the return spring after the first centrifugal weight oscillates radially outward through the predetermined angle or more.

With the first feature of the invention, it is possible to impart a decompression function and an exhaust gas recirculation function to the valve operating system by simply providing the decompression cam member, the exhaust gas recirculation cam member, and the common centrifugal mechanism on the camshaft of the valve operating system, to thereby provide an inexpensive valve operating system having a decompression function and an exhaust gas recirculation function.

With the second feature of the invention, the centrifugal mechanism common to the decompression cam member and the exhaust gas recirculation cam member has a simple configuration including the common centrifugal weight and the common drive member, to thereby provide a more inexpensive valve operating system having a decompression function and an exhaust gas recirculation function.

With the third feature of the invention, the decompression cam member and the exhaust gas recirculation cam member can be successively operated via the common drive ring by the common centrifugal weight that oscillates according to an increase in the engine rotational speed as well as the first and second return springs that repel such oscillation. Moreover, a timing of operating the second return spring can be selected to freely set an operation region of the exhaust gas recirculation cam member regardless of an operation region of the decompression cam member. Thus, merely adding a simple structure to the valve operating system provides an inexpensive valve operating system having a decompression function and an exhaust gas recirculation function of desired properties without mutual interference.

With the fourth feature of the invention, the decompression cam member and the exhaust gas recirculation cam member can be successively operated via the common drive ring by the first and second centrifugal weights that oscillate according to an increase in the engine rotational speed, and one return spring that repels such oscillation. Moreover, a timing of canceling the operation of the second centrifugal weight can be selected to freely set an operation region of the exhaust gas recirculation cam member regardless of an operation region of the decompression cam member. Thus, merely adding a simple structure to the valve operating system provides an inexpensive valve operating system having a decompression function and an exhaust gas recirculation function of desired properties without mutual interference.

DESCRIPTION OF THE PREFERRED EMBODIMENTS

Now, preferred embodiments of the invention will be described with reference to the drawings.

A first embodiment of the invention shown in FIGS. 1 to 10 will be first described.

Figure 1:
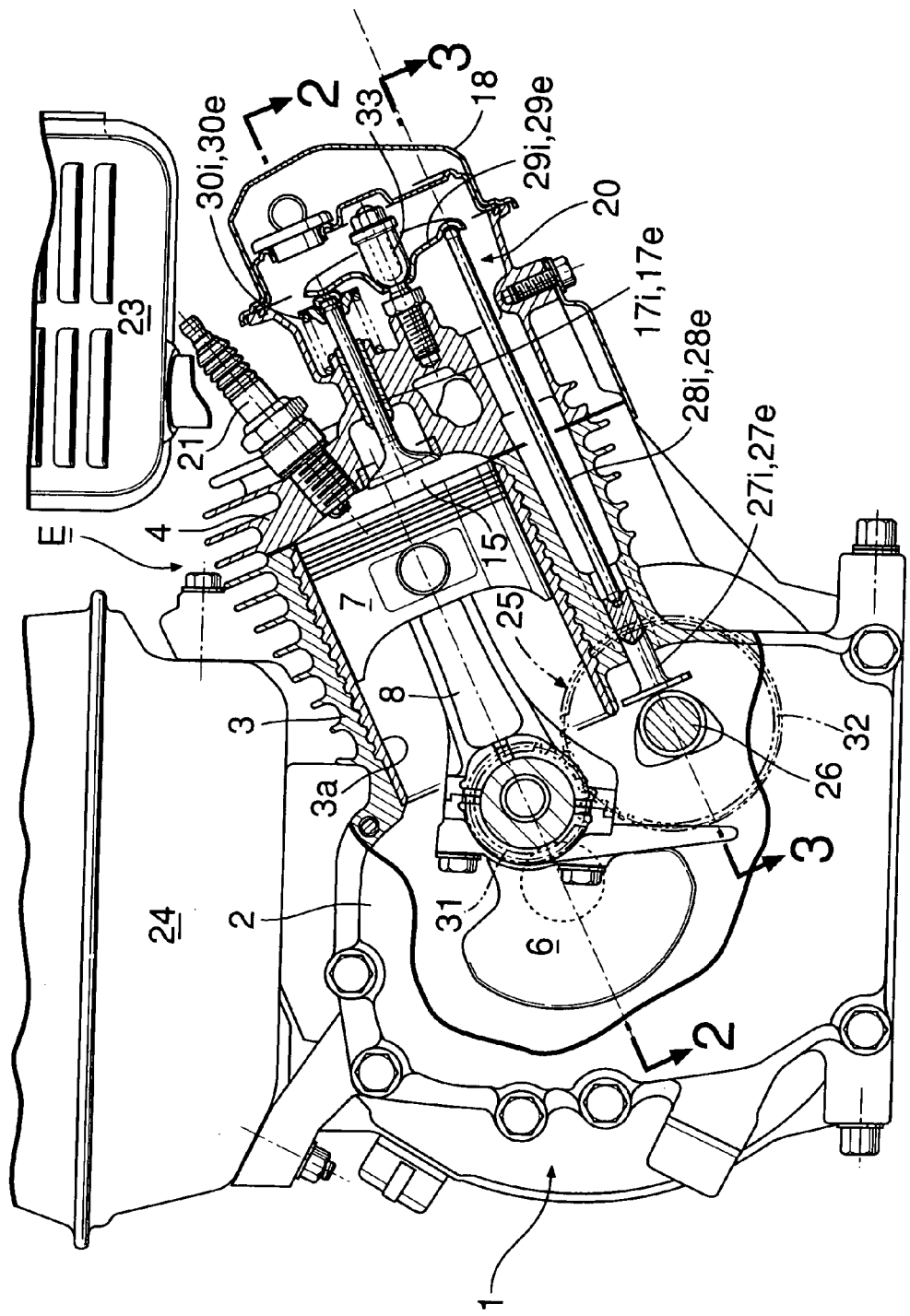
FIG. 1 is a vertical sectional side view of an internal combustion engine including a valve operating system according to a first embodiment of the present invention.
Figure 2:
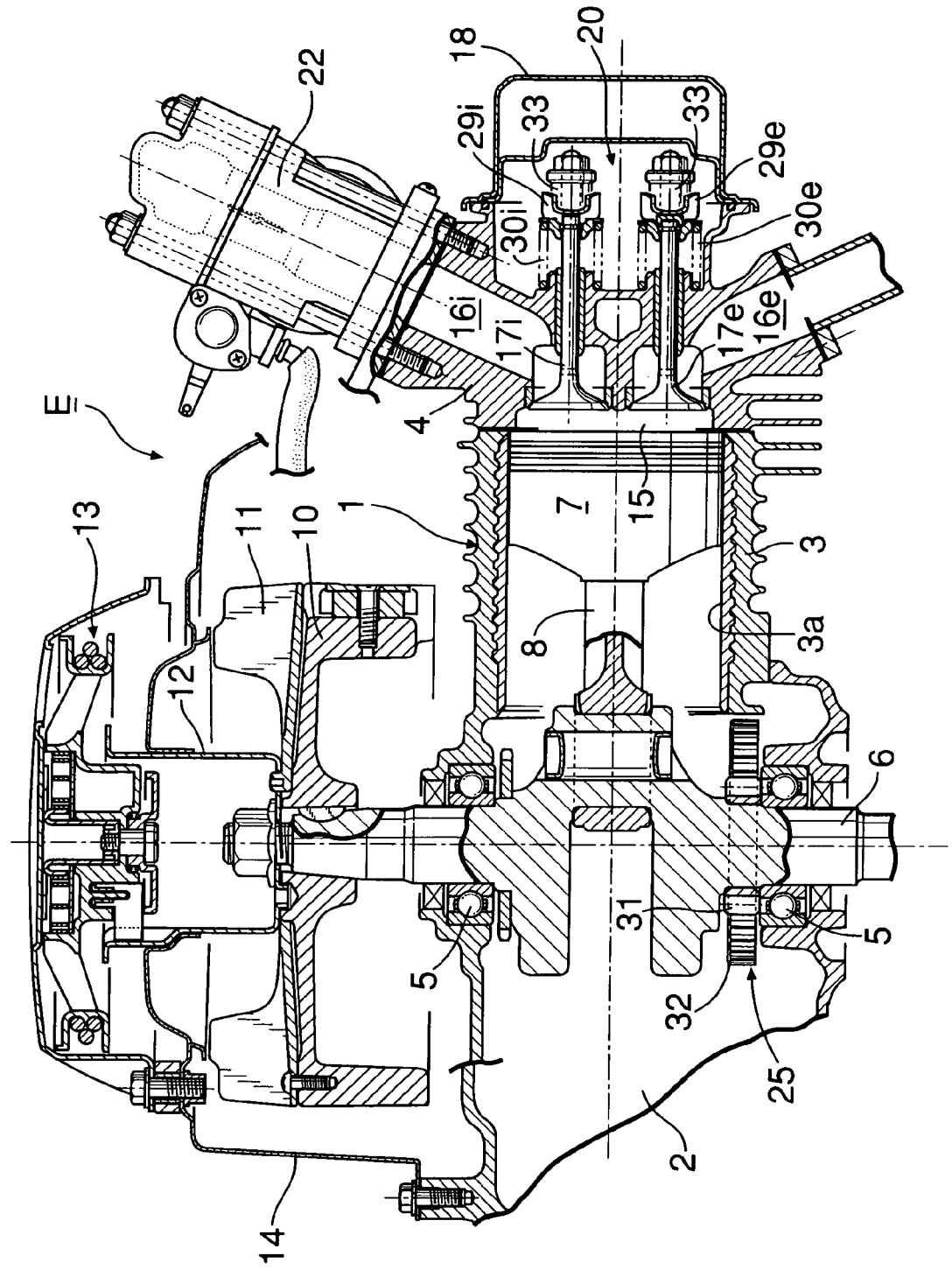
FIG. 2 is a sectional view taken along the line 2—2 in FIG. 1.
Figure 3:
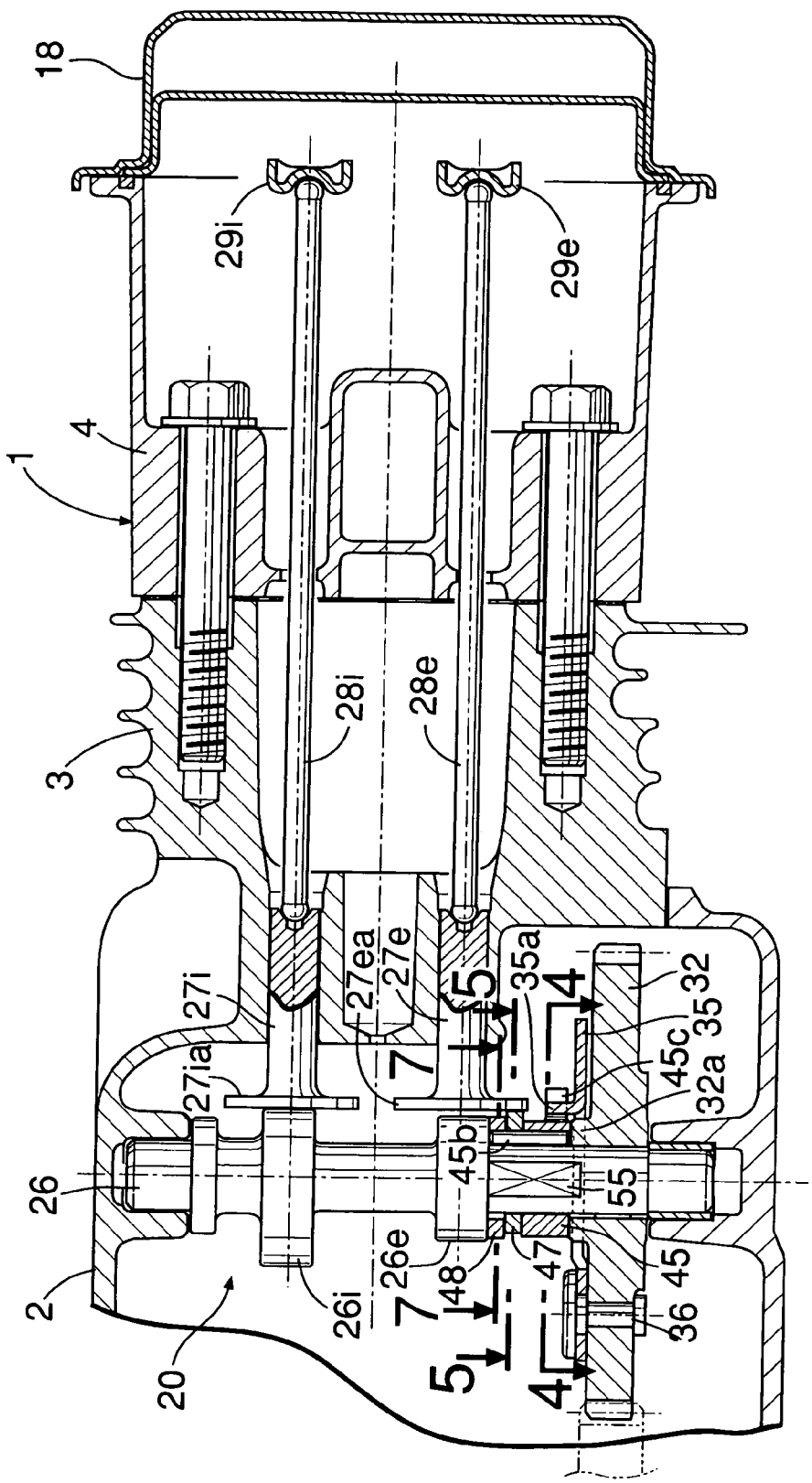
FIG. 3 is a sectional view taken along the line 3—3 in FIG. 1.

In FIGS. 1 to 3, an engine body 1 of an internal combustion engine E includes a crankcase 2, a cylinder block 3 extending obliquely upward from one side of the crankcase 2, and a cylinder head 4 joined to an upper end surface of the cylinder block 3. The crankcase 2 houses a crankshaft 6 supported on left and right sidewalls thereof via bearings 5 and 5. The crankshaft 6 is connected to a piston 7 fitted in a cylinder bore 3a of the cylinder block 3 via a connecting rod 8. A flywheel 10 is secured to one end of the crankshaft 6 protruding outside the crankcase 2. An annular cooling fan 11 is secured to an outer side surface of the flywheel 10. A starting cylinder shaft 12 protruding axially outward from the cooling fan 11 is secured on a center of the flywheel 10. A known recoil starter 13 that can engage the starting cylinder shaft 12 to crank the crankshaft 6 is mounted to the crankcase 2 via a bracket 14. The other end of the crankshaft 6 protrudes outside the other sidewall of the crankcase 2 as an output end.

The cylinder head 4 includes a combustion chamber 15 connecting to the cylinder bore 3a, an intake port 16i and an exhaust port 16e having inner ends opening into the combustion chamber 15, and an intake valve 17i and an exhaust valve 17e that open and close the intake port 16i and the exhaust port 16e. A valve operating system 20 that opens and closes the intake valve 17i and the exhaust valve 17e is provided on an region from the crankcase 2 to the cylinder head 4. The valve operating system 20 will be described later in detail.

An ignition plug 21 whose electrode faces the combustion chamber 15 is screwed into the cylinder head 4. A carburetor 22 and an exhaust muffler 23 connecting to outer ends of the intake port 16i and the exhaust port 16e, respectively, are mounted to the cylinder head 4.

A fuel tank 24 is mounted to an upper portion of the crankcase 2 to be adjacent to the carburetor 22 and the exhaust muffler 23.

Now, the valve operating system 20 will be described.

In FIGS. 1 to 3, the valve operating system 20 includes: a camshaft 26 that is supported on the left and right sidewalls of the crankcase 2 and driven by the crankshaft 6 via a timing transmission device 25; an intake tappet 27i and an exhaust tappet 27e that are axially slidably supported by the cylinder block 3 to cause flanges 27ia and 27ea at lower ends to abut against an intake cam 26i and an exhaust cam 26e of the camshaft 26; an intake push rod 28i and an exhaust push rod 28e that have lower ends connecting to upper ends of the intake tappet 27i and the exhaust tappet 27e and upper ends extending above the cylinder head 4; and an intake rocker arm 29i and an exhaust rocker arm 29e that are oscillably supported by a pair of spherical support members 33 and 33 secured to the cylinder head 4. The intake rocker arm 29i is placed so that one end thereof abuts against a head of the intake valve 17i and the other end connects to an upper end of the intake push rod 28i. The exhaust rocker arm 29e is placed so that one end thereof abuts against a head of the exhaust valve 17e and the other end connects to an upper end of the exhaust push rod 28e.

Thus, when the intake cam 26i and the exhaust cam 26e push up the intake tappet 27i and the exhaust tappet 27e, respectively, the intake push rod 28i and the exhaust push rod 28e that move along with these tappets cause the intake rocker arm 29i and the exhaust rocker arm 29e to oscillate in opening directions of the intake valve 17i and the exhaust valve 17e. An intake valve spring 30i and an exhaust valve spring 30e that urge the intake valve 17i and the exhaust valve 17e in closing directions are mounted to the intake valve 17i and the exhaust valve 17e, respectively. A head cover 18 that covers the valve operating system 20 including the intake rocker arm 29i and the exhaust rocker arm 29e on the cylinder head 4, is joined to an upper end surface of the cylinder head 4.

Figure 4:
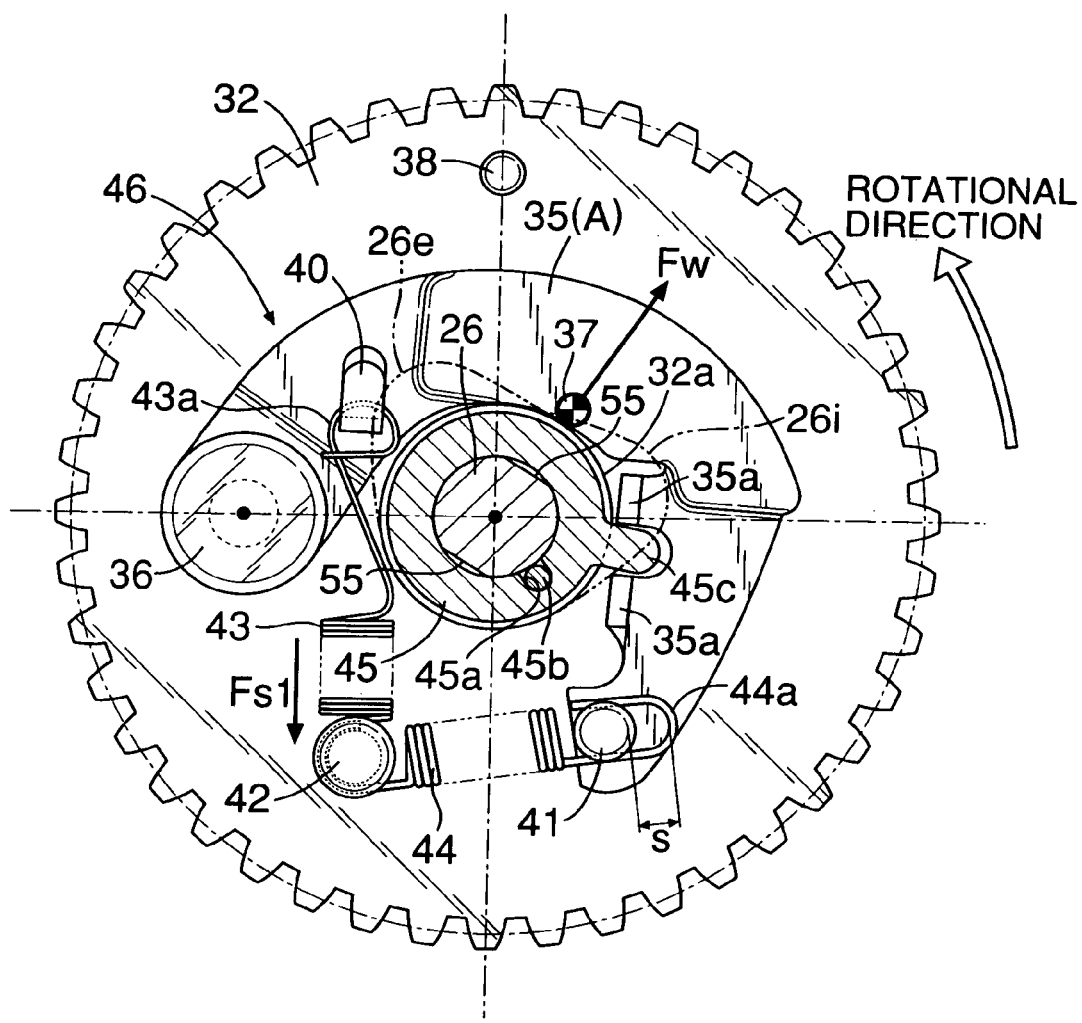
FIG. 4 is a sectional view taken along the line 4—4 in FIG. 3.

The timing transmission device 25 includes a drive gear 31 secured to the crankshaft 6, and a driven gear 32 that is secured to the camshaft 26 and driven by the drive gear 31 at a 1/2 reduction ratio. As shown in FIGS. 3 and 4, one end of a centrifugal weight 35 formed into a U-shaped so as to surround a half circumference of the camshaft 26 is supported on the driven gear 32 via a pivot 36. The centrifugal weight 35 has a center of gravity 37 in a U-shaped bending portion thereof, and oscillates around the pivot 36 between a contracted position A (see FIGS. 4 and 5) where the U-shaped bending portion abuts against a hub 32a of the driven gear 32 and an extended position B (see FIG. 8) where an outer side surface of the U-shaped bending portion abuts against a stopper 38 protruding on a side surface of the driven gear 32. The centrifugal weight 35 has a first movable connection 40 and a second movable connection 41 in a middle portion and an oscillation end thereof. Movable ends 43a and 44a of a first return spring 43 and a second return spring 44 having secured ends connected to a common secured connection 42 of the driven gear 32 and constituted by tension coil springs are connected to the first movable connection 40 and the second movable connection 41. The first return spring 43 is adapted to always urge the centrifugal weight 35 radially inward with a predetermined set load Fs1. A certain play S is provided between the movable end 44a of the second return spring 44 and the second movable connection 41. The second return spring 44 does not resist the oscillation of the centrifugal weight 35 until the centrifugal weight 35 oscillates radially outward through a predetermined angle from the contracted position A. In other words, the second return spring 44 is adapted to exert a repulsive force that urges the centrifugal weight 35 radially inward in cooperation with the first return spring 43 after the centrifugal weight 35 oscillates radially outward through the predetermined angle from the contracted position A.

As shown in FIG. 3, a drive ring 45, a decompression cam member 47, and an exhaust gas recirculation cam member 48 are fitted to the camshaft 26 in order from the side of the centrifugal weight 35 between the centrifugal weight 35 and the exhaust cam 26e. The drive ring 45 is rotatably fitted to an outer peripheral surface of the camshaft 26. The centrifugal weight 35 has a pair of connection pieces 35a and 35a placed so as to hold a connection protrusion 45c protruding from an outer peripheral surface of the drive ring 45 therebetween from opposite sides along a rotational direction of the drive ring 45. The radially outward oscillation of the centrifugal weight 35 causes the rotation of the drive ring 45.

The drive ring 45 has an axial holding groove 45a in an inner peripheral surface thereof, to hold a pin 45b extending axially along the camshaft 26 between the driven gear 32 and the exhaust cam 26e. The pin 45b can roll on the outer peripheral surface of the camshaft 26 with a rotation of the drive ring 45 relative to the camshaft 26.

Figure 5:
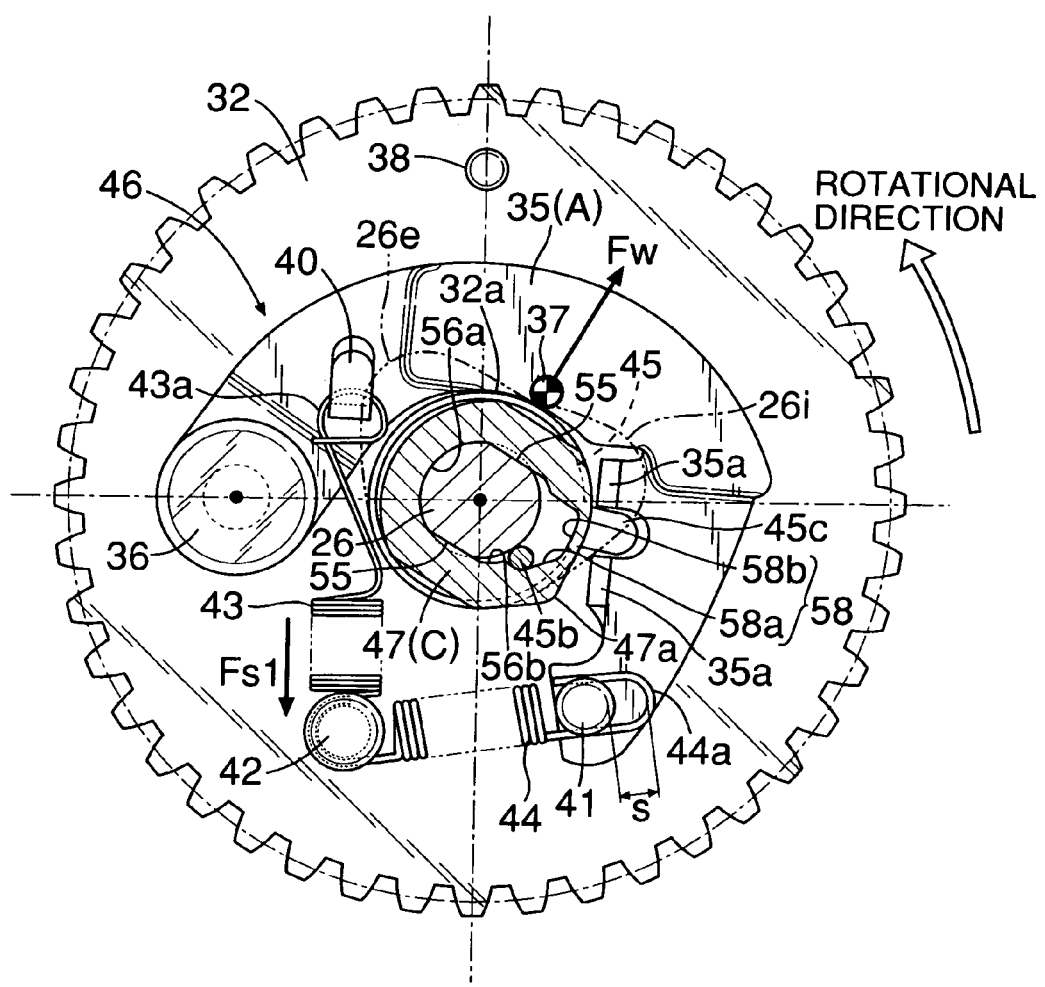
FIG. 5 is a sectional view taken along the line 5—5 in FIG. 3.
Figure 6:
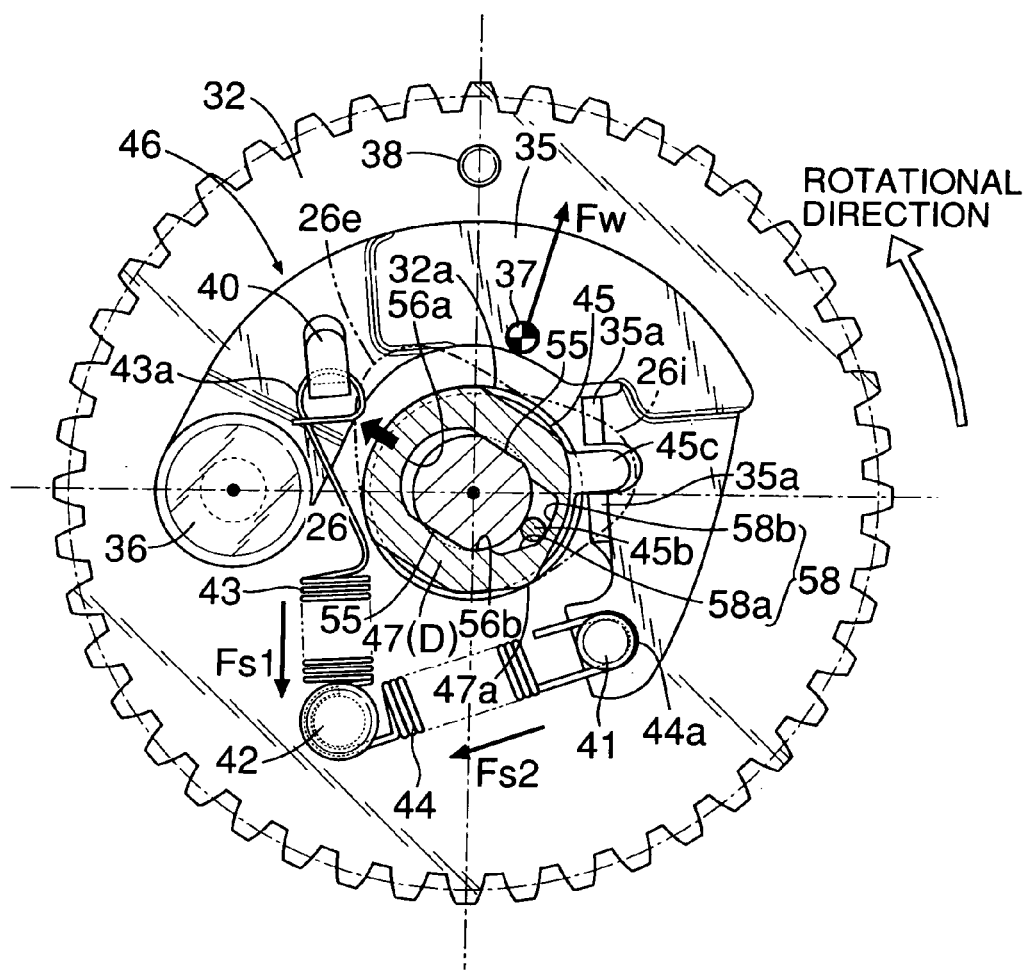
FIG. 6 illustrates an operation corresponding to FIG. 5.
Figure 7:
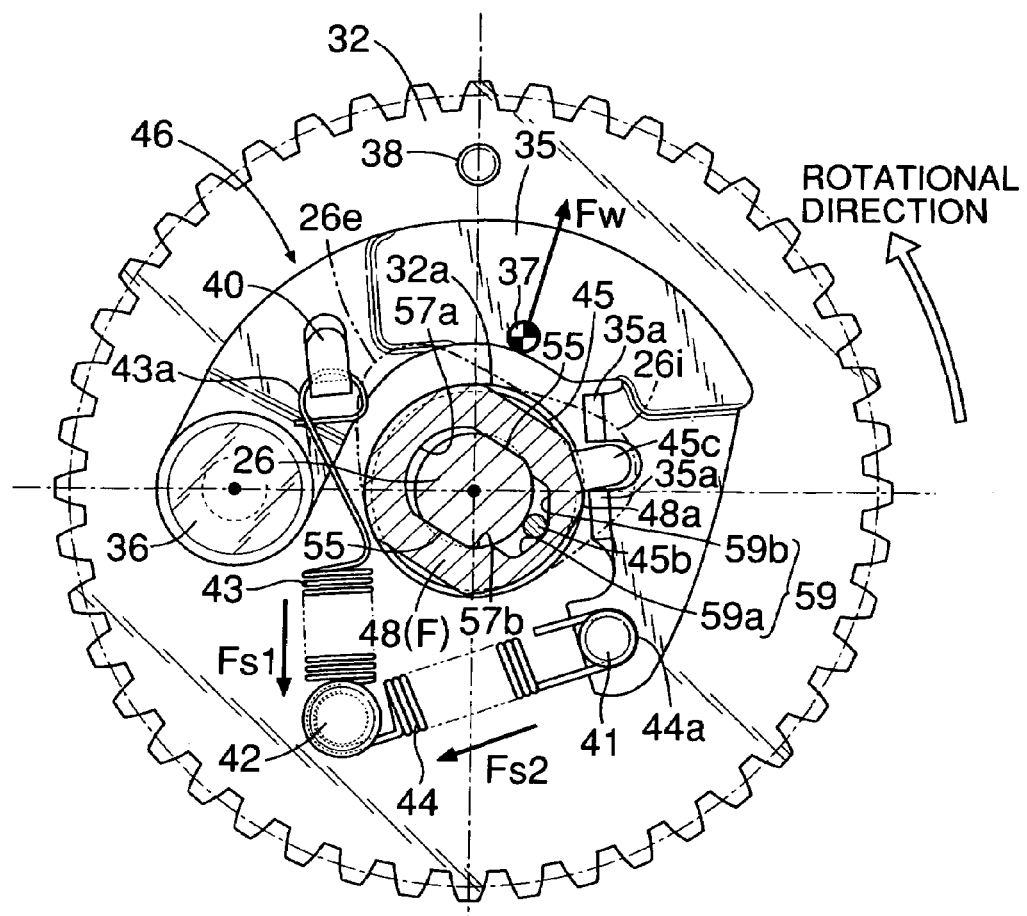
FIG. 7 is a sectional view taken along the line 7—7 in FIG. 3.
Figure 8:
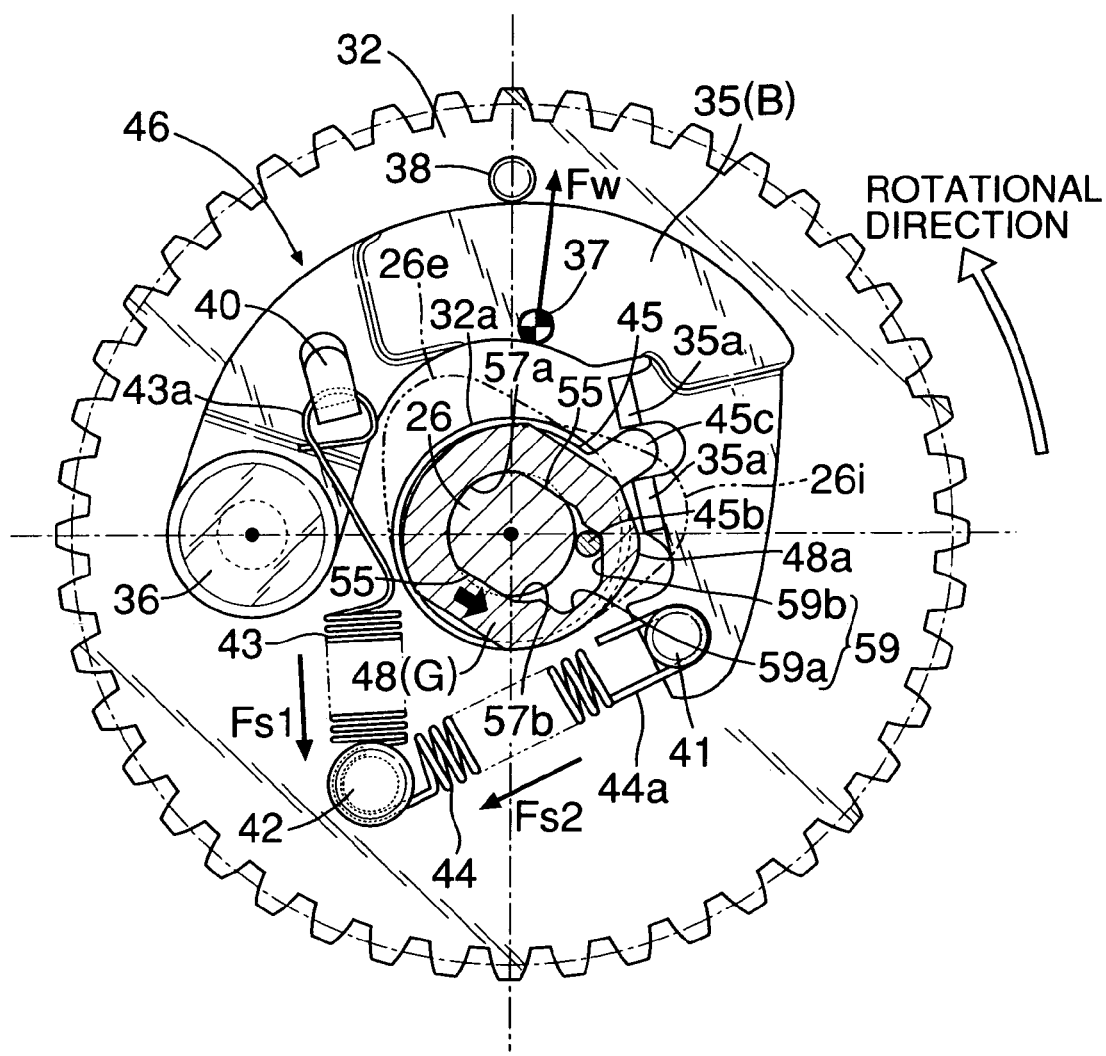
FIG. 8 illustrates an operation corresponding to FIG. 7.

In FIGS. 5 to 8, the decompression cam member 47 and the exhaust gas recirculation cam member 48 are fitted to a pair of guide surfaces 55 and 55 formed on opposite side surfaces of the camshaft 26 and parallel to each other so that these cam members slide along a diameter line of the camshaft 26. This allows the decompression cam member 47 to slide along the guide surfaces 55 and 55 between an operative position C (FIG. 5) and an inoperative position D (FIG. 6). The operative position C and the inoperative position D are determined by inner end surfaces 56a and 56b of the decompression cam member 47 orthogonal to the guide surfaces 55 and 55 and abutting against the outer peripheral surface of the camshaft 26. The exhaust gas recirculation cam member 48 can slide along the guide surfaces 55 and 55 between an inoperative position F (FIG. 7) and an operative position G (FIG. 8). The operative position G and the inoperative position F are determined by inner end surfaces 57a and 57b of the exhaust gas recirculation cam member 48 orthogonal to the guide surfaces 55 and 55 and abutting against the outer peripheral surface of the camshaft 26.

The decompression cam member 47 and the exhaust gas recirculation cam member 48 integrally have, on outer peripheral surfaces thereof, protruding cams 47a and 48a much lower than a nose of the exhaust cam 26e. The protruding cams 47a and 48a protrude outward beyond a base circle of the exhaust cam 26e in the operative positions C and G, and retract into the base circle in the inoperative positions D and F. The protruding cam 47a of the decompression cam member 47 is placed so as to push up the exhaust tappet 27e in a compression stroke of the engine when the protruding cam 47a is in the operative position C. The protruding cam 48a of the exhaust gas recirculation cam member 48 is placed so as to push up the exhaust tappet 27e in an intake stroke of the engine when the protruding cam 48a is in the operative position G.

As shown in FIGS. 5 and 6, a recessed cam 58 that cooperates with the pin 45b is formed in a center of the inner end surface 56b of the decompression cam member 47 on the side of the protruding cam 47a. The recessed cam 58 includes: an inclined surface 58a that is pressed by the pin 45b to force the decompression cam member 47 into the operative position C, when the centrifugal weight 35 is held in the contracted position A by an urging force of the first return spring 43; and an arcuate bottom surface 58b that prevents interference with the pin 45b and allows the decompression cam member 47 to move to the inoperative position D, after the centrifugal weight 35 rotates through a predetermined angle or more from the contracted position A (a state in FIG. 6). By forming the recessed cam 58, a center of gravity of the decompression cam member 47 is offset from the center thereof to an opposite side from the recessed cam 58. When the pin 45b comes to a position facing the arcuate bottom surface 58b, the decompression cam member 47 moves to the inoperative position D by a centrifugal force acting on the center of gravity.

On the other hand, a recessed cam 59 that cooperates with the pin 45b is formed in a center of the inner end surface 57b of the exhaust gas recirculation cam member 48 on the side of the protruding cam 48a. The recessed cam 59 includes: an arcuate bottom surface 59a that prevents interference with the pin 45b and allows the exhaust gas recirculation cam member 48 to move to the inoperative position F during rotation of the centrifugal weight 35 from the contracted position A through a predetermined angle; and an inclined surface 59b that is pressed by the pin 45b to force the exhaust gas recirculation cam member 48 into the operative position G when the centrifugal weight 35 rotates radially outward through a predetermined angle or more by a centrifugal force. By forming the recessed cam 59, a center of gravity of the exhaust gas recirculation cam member 48 is offset from the center thereof to an opposite side from the recessed cam 59. When the pin 45b is in a position facing the arcuate bottom surface 59a, the exhaust gas recirculation cam member 48 moves to the operative position G by a centrifugal force acting on the center of gravity.

In the above description, the centrifugal weight 35, the first return spring 43 and the second return spring 44, and the drive ring 45 cooperate with one another to constitute a common centrifugal mechanism 46 that operates the decompression cam member 47 and the exhaust gas recirculation cam member 48.

Next, an operation of the first embodiment will be described.

Figure 10:
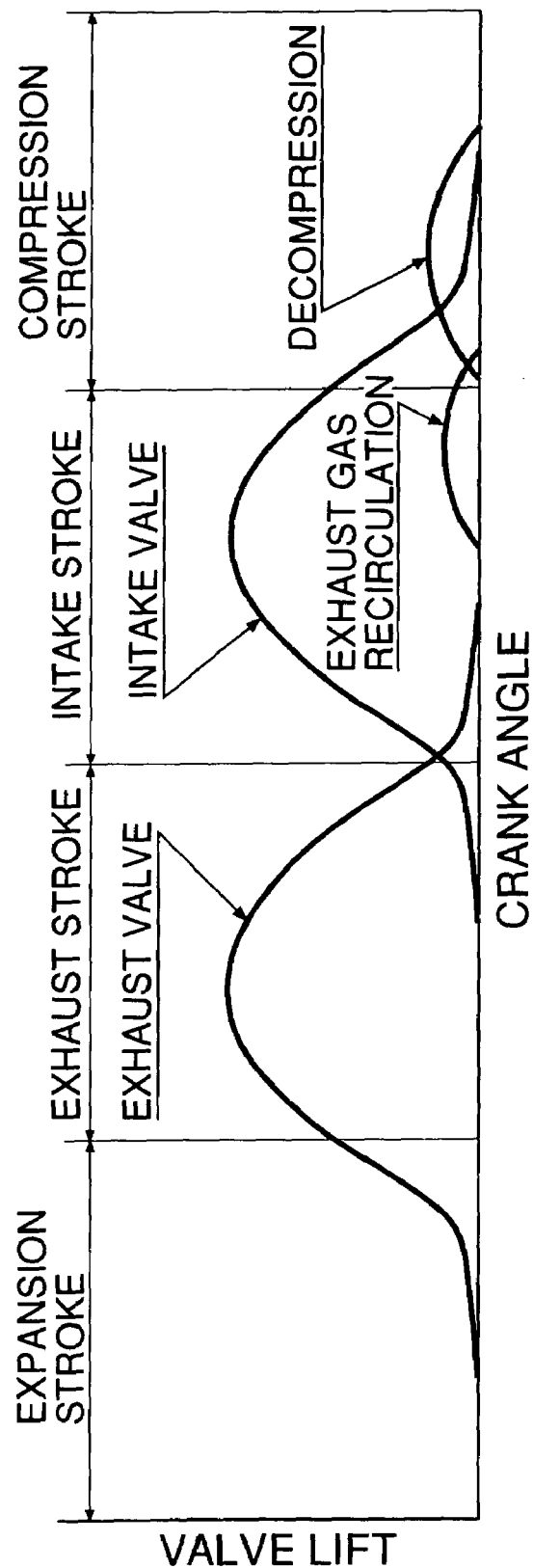
FIG. 10 is a diagram showing a relationship between a rotation angle of a crankshaft and opening/closing timings of an intake valve and an exhaust valve.

When the crankshaft 6 rotates, the camshaft 26 is driven by the crankshaft 6 via the timing transmission device 25 at a 1/2 reduction ratio. In the intake stroke, the intake cam 26i pushes up the intake push rod 28i via the intake tappet 27i, causes the intake rocker arm 29i to oscillate, and forces the intake valve 17i to open against an urging force of the intake valve spring 30i. In the exhaust stroke, the exhaust cam 26e pushes up the exhaust push rod 28e via the exhaust tappet 27e, causes the exhaust rocker arm 29e to oscillate, and forces the exhaust valve 17e to open against an urging force of the exhaust valve spring 30e. Such opening/closing timings of the intake valve 17i and the exhaust valve 17e are shown in FIG. 10.

Figure 9:
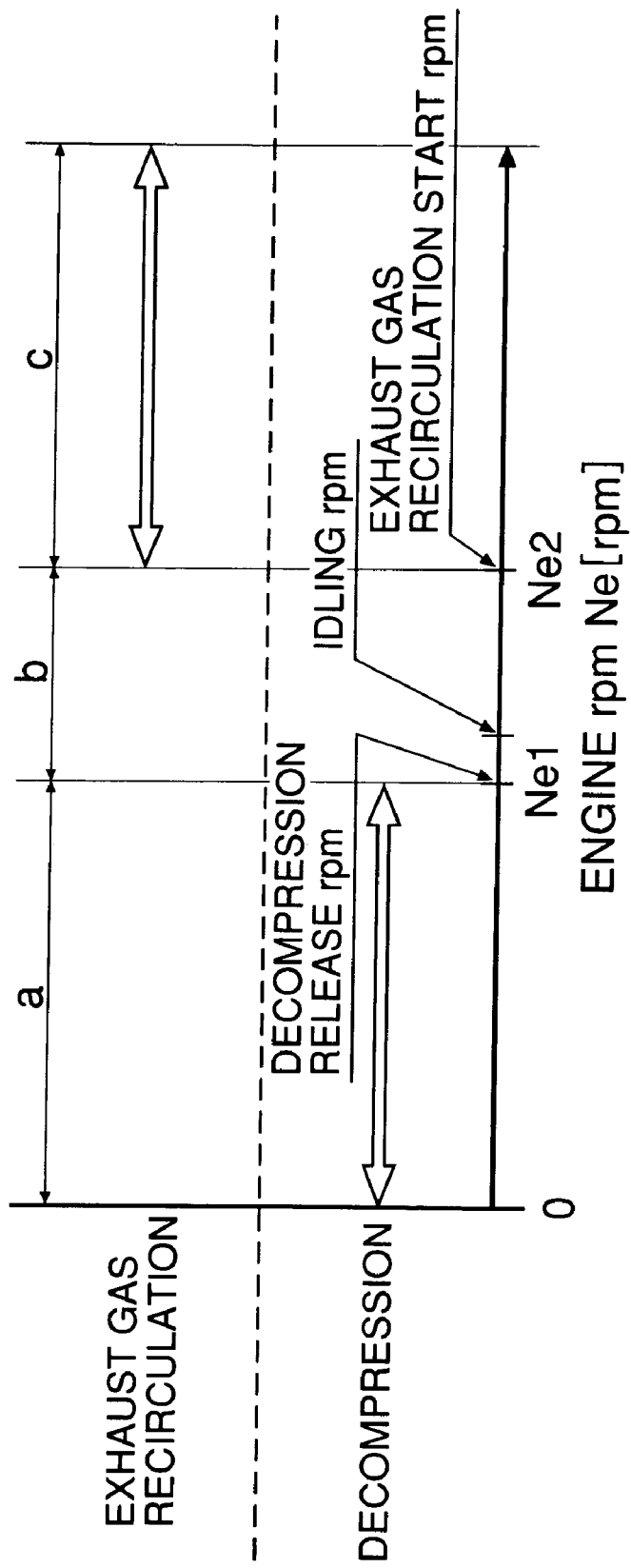
FIG. 9 is a diagram showing operation regions of a decompression cam member and an exhaust gas recirculation cam member.

In FIG. 9, the centrifugal weight 35 is held in the contracted position A by the set load Fs1 of the first return spring 43 as shown in FIGS. 4 and 5 in a starting rotation region a of the engine from the engine rotational speed Ne of zero to a predetermined rotational speed Ne1 lower than an idling rotational speed. At this time, the centrifugal weight 35 causes the pin 45b of the drive ring 45 positioned via the connection protrusion 45c and the connection pieces 35a and 35a that engage each other, to press the inclined surface 58a of the recessed cam 58 of the decompression cam member 47. Thus, the decompression cam member 47 is held in the operative position C where the protruding cam 47a protrudes outward beyond the base circle of the exhaust cam 26e. Therefore, if the recoil starter 13 is operated to start the internal combustion engine E, the crankshaft 6 is cranked from the starter 13 via the starting cylinder shaft 12, and at the same time, the camshaft 26 is driven via the timing transmission device 25. Consequently, as described above, in the compression stroke of the piston 7, the protruding cam 47a of the decompression cam member 47 slightly pushes up the exhaust tappet 27e to slightly open the exhaust valve 17e via the exhaust push rod 28e and the exhaust rocker arm 29e. The timing at this time is shown in FIG. 10. This causes part of a compression gas in the cylinder bore 3a to be discharged through the exhaust port 16e to prevent an increase in a compression pressure of the gas, thus reducing an operation load of the starter 13. Therefore, the crankshaft 6 can be cranked relatively lightly and swiftly, thereby allowing easy starting of the engine.

When the engine starts and the engine rotational speed Ne exits the starting rotation region a, as shown in FIG. 6, moment of the centrifugal weight 35 around the pivot 36 by a centrifugal force Fw overcomes moment of the centrifugal weight 35 around the pivot 36 by the set load Fs1 of the first return spring 43, to cause the centrifugal weight 35 to oscillate radially outward from the contracted position A. Such oscillation is transmitted from the connection piece 35a to the connection protrusion 45c, to rotate the drive ring 45 counterclockwise and move the pin 45b to a position facing the bottom surface 58b of the recessed cam 58 of the decompression cam member 47. Thus, the decompression cam member 47 moves to the inoperative position D by the centrifugal force without interference by the pin 45b, thereby retracting the protruding cam 47a into the base circle of the exhaust cam 26e.

During this process, in the exhaust gas recirculation cam member 48, the bottom surface 59a of the recessed cam 59 faces the pin 45b of the drive ring 45 as shown in FIG. 7, and thus the exhaust gas recirculation cam member 48 is held in the inoperative position F by the centrifugal force without interference by the pin 45b, thereby retracting the protruding cam 48a into the base circle of the exhaust cam 26e.

Thus, the exhaust valve 17e is controlled to be opened and closed only depending on the operation of the exhaust cam 26e as usual. Such a state continues in a low speed operation region b of the engine where the engine rotational speed Ne is Ne1 to Ne2. With the movement of the centrifugal weight 35 at about the time when the engine rotational speed Ne reaches Ne2, as shown in FIG. 7, the play S between the second movable connection 41 of the centrifugal weight 35 and the movable end 44a of the second return spring 44 disappears, so that action of the second return spring 44 on the centrifugal weight 35 starts. Thus, after that, the position of the centrifugal weight 35 is determined by a balance between moment of the centrifugal weight 35 around the pivot 36 due to a return force Fs1 of the first return spring 43 and a return force Fs2 of the second return spring 44, and moment of the centrifugal weight 35 around the pivot 36 due to the centrifugal force Fw, so that an oscillation speed of the centrifugal weight 35 according to an increase in the engine rotational speed Ne slows.

Next, when the engine rotational speed Ne exceeds Ne2 and the internal combustion engine E enters a high speed operation region C, the centrifugal weight 35 finally reaches the extended position B where the centrifugal weight 35 abuts against the stopper 38 on the driven gear 32, and the resultant further counterclockwise rotation of the drive ring 45 causes the pin 45b to press the inclined surface 59b of the recessed cam 59 of the exhaust gas recirculation cam member 48 and move the exhaust gas recirculation cam member 48 to the operative position G against the centrifugal force. Therefore, the protruding cam 48a of the exhaust gas recirculation cam member 48 protrudes beyond the base circle of the exhaust cam 26e. Thus, as described above, in the intake stroke of the piston 7, the protruding cam 48a of the exhaust gas recirculation cam member 48 slightly pushes up the exhaust tappet 27e to slightly open the exhaust valve 17e via the exhaust push rod 28e and the exhaust rocker arm 29e. This causes an exhaust gas remaining in the exhaust port 16e to be drawn into the combustion chamber 15, that is, the exhaust gas is recirculated. The exhaust gas prevents an excessive increase in combustion temperature during combustion of air-fuel mixture in a later expansion stroke, to reduce a NOx concentration in the exhaust gas, reduce a HC concentration and improve fuel consumption.

As described above, the decompression cam member 47 and the exhaust gas recirculation cam member 48 can be successively operated via the common drive ring 45 by the common centrifugal weight 35 that oscillates according to the increase in the engine rotational speed Ne as well as the first and second return springs 43 and 44 that repel such oscillation. Further, a timing of operating the second return spring 44, that is, the play S of the movable end 44a of the second return spring 44 can be selected to freely set an operation region of the exhaust gas recirculation cam member 48 regardless of an operation region of the decompression cam member 47. Thus, merely adding a simple structure to the valve operating system 20 provides an inexpensive valve operating system 20 having a decompression function and an exhaust gas recirculation function of desired properties without mutual interference.

Next, a second embodiment of the invention shown in FIGS. 11 to 17 will be described.

Figure 11:
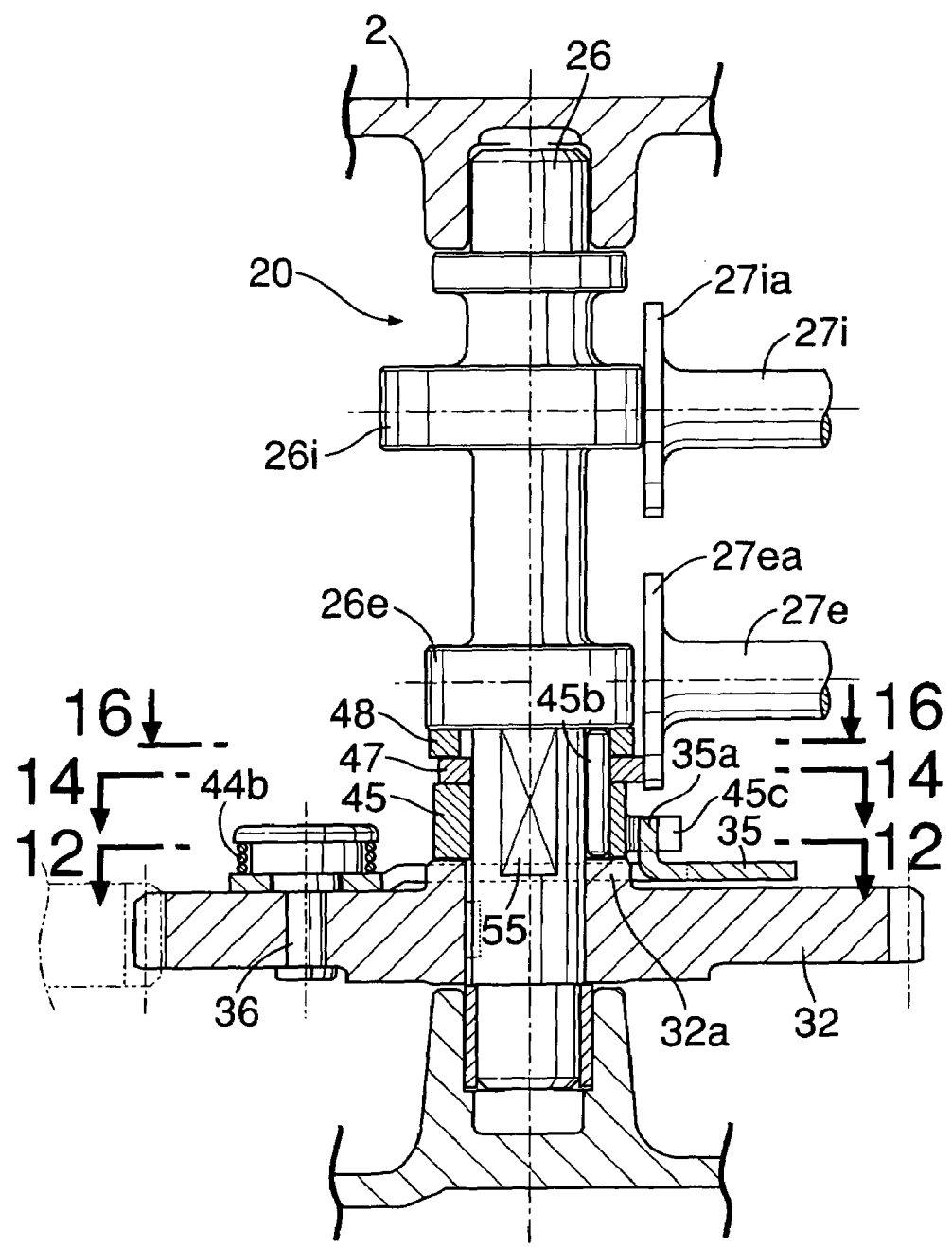
FIG. 11 is a vertical sectional side view of potions around a camshaft in a valve operating system according to a second embodiment of the present invention.
Figure 12:
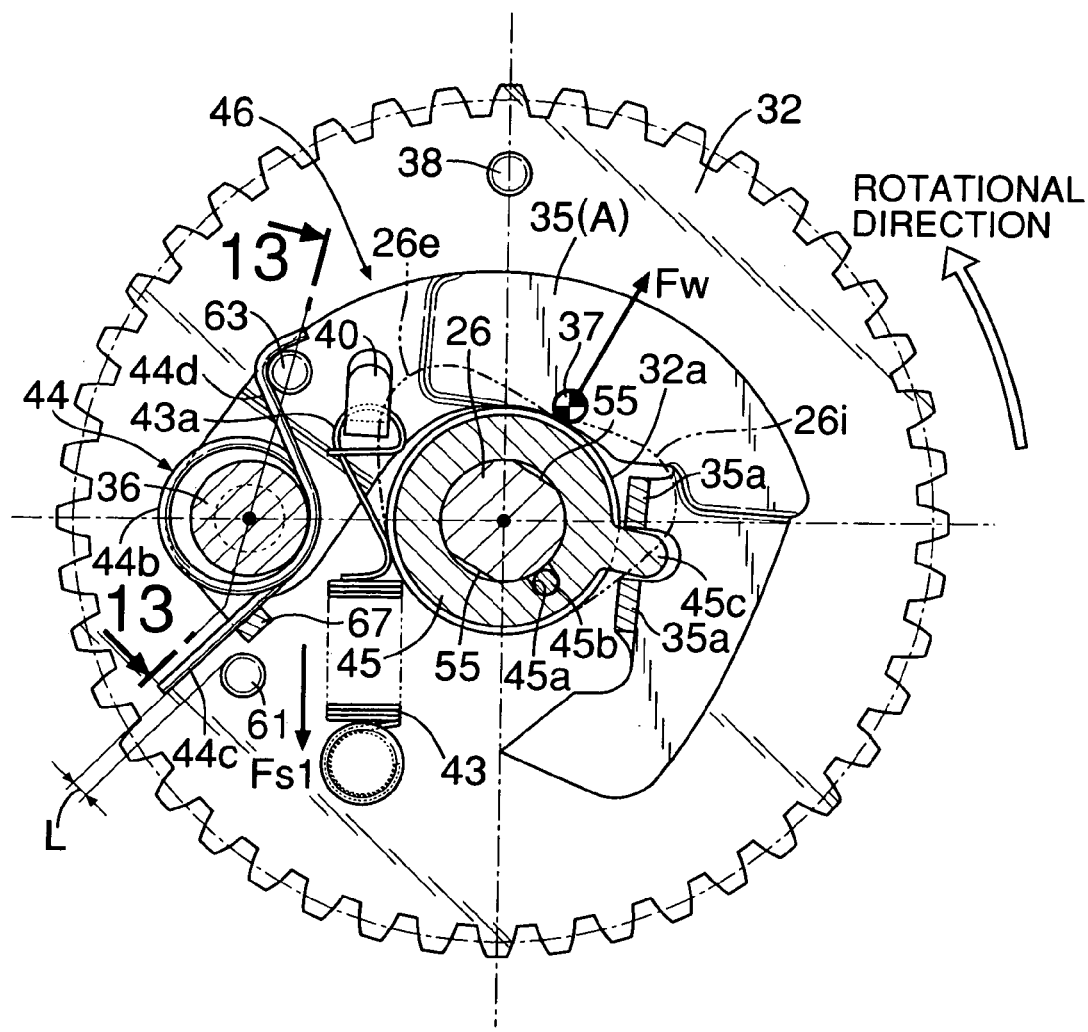
FIG. 12 is a sectional view taken along the line 12—12 in FIG. 11.
Figure 13:
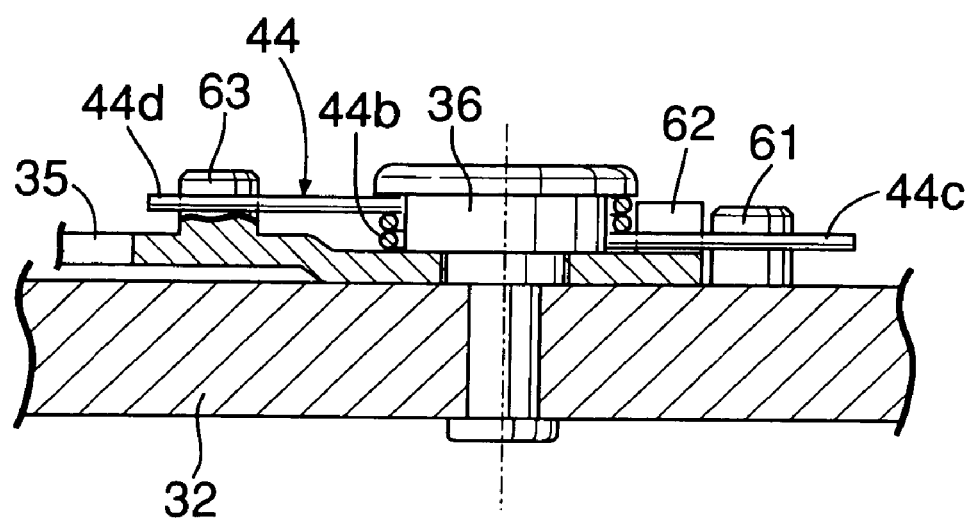
FIG. 13 is a sectional view taken along the line 13—13 in FIG. 12.

As shown in FIGS. 11 and 12, a centrifugal weight 35 of a centrifugal mechanism 46 supported on a driven gear 32 via a pivot 36 has a U-shaped as in the first embodiment. The centrifugal weight 35 has a center of gravity 37 in a U-shaped bending portion thereof, and can oscillate around the pivot 36 between a contracted position A where the U-shaped bending portion abuts against a hub 32a of the driven gear 32 and an extended position B where an outer side surface of the U-shaped bending portion abuts against a stopper 38 protruding on a side surface of the driven gear 32. As in the first embodiment, the centrifugal weight 35 has a movable connection 40. A movable end 43a of a first return spring 43 having a secured end connected to a secured connection 42 of the driven gear 32 is connected to the movable connection 40. The first return spring 43 is adapted to always urge the centrifugal weight 35 radially inward with a predetermined set load Fs1.

Unlike the previous embodiment, a coil portion 44b of a second return spring 44 constituted by a torsion spring is loosely fitted over an outer periphery of the pivot 36. While a predetermined set load Fs2 is applied to the coil portion 44b in a torsional direction, a first arm 44c and a second arm 44d of the second return spring 44 are locked to a first locking piece 62 and a second locking piece 63 formed on the centrifugal weight 35 so as to hold the pivot 36 therebetween. A tip end of the first arm 44c extends outward beyond an end of the centrifugal weight 35, and a stopper pin 61 facing one side surface of the tip end with a predetermined distance L protrudes on a side surface of the driven gear 32. The second return spring 44 generally oscillates together with the centrifugal weight 35 and does not resist the oscillation of the centrifugal weight 35 until the centrifugal weight 35 oscillates radially outward through a predetermined angle from the contracted position A. However, after the centrifugal weight 35 oscillates radially outward through the predetermined angle or more from the contracted position A, the second return spring 44 exerts a repulsive force that urges the centrifugal weight 35 radially inward in cooperation with the first return spring 43 because the first arm 44c is caught by the stopper pin 61 to further twist the coil portion 44b.

Because other components are the same as those in the first embodiment, components in FIGS. 11 to 17 corresponding to those in the first embodiment are denoted by the same reference numerals, and descriptions thereof is omitted.

Figure 14:
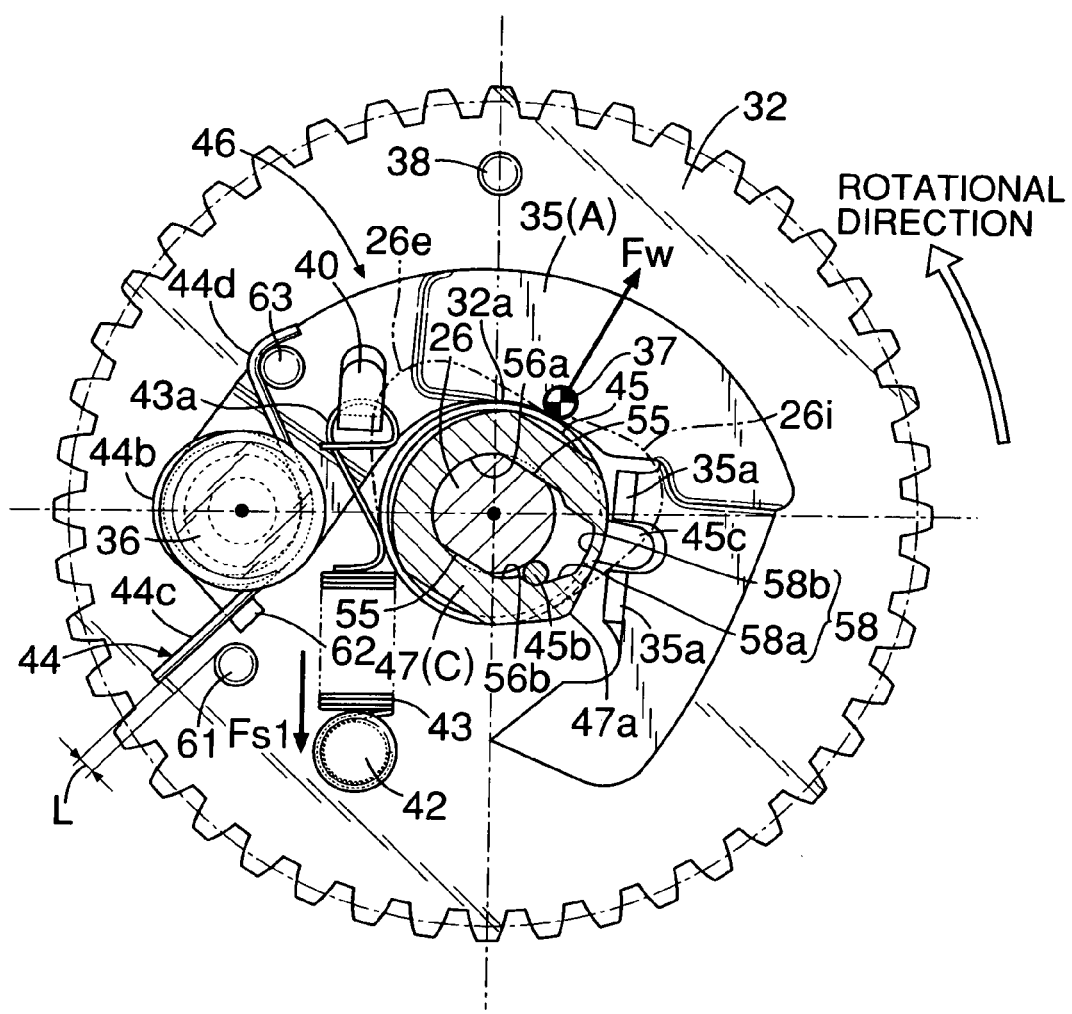
FIG. 14 is a sectional view taken along the line 14—14 in FIG. 11.

The centrifugal weight 35 is held in the contracted position A by the set load Fs1 of the first return spring 43 as shown in FIGS. 12 and 14 in a starting rotation region a (see FIG. 9) of the engine from the engine rotational speed Ne of zero to a predetermined rotational speed Ne1 lower than an idling rotational speed. Thus, as in the first embodiment, the centrifugal weight 35 causes a pin 45b of a drive ring 45 positioned via a connection protrusion 45c and connection pieces 35a and 35a that engage each other, to press an inclined surface 58a of a recessed cam 58 of a decompression cam member 47. Thus, the decompression cam member 47 is held in an operative position C (see FIG. 14) where a protruding cam 47a protrudes outward beyond a base circle of an exhaust cam 26e. Then, if a recoil starter 13 is operated to start the internal combustion engine E, a crankshaft 6 is cranked from the starter 13 via a starting cylinder shaft 12, and at the same time, a camshaft 26 is driven via a timing transmission device 25. Thus, in a compression stroke of a piston 7, the protruding cam 47a of the decompression cam member 47 slightly pushes up an exhaust tappet 27e to slightly open an exhaust valve 17e via an exhaust push rod 28e and an exhaust rocker arm 29e. The timing at this time is shown in FIG. 10 similarly to the first embodiment. This causes part of a compression gas in a cylinder bore 3a to be discharged through an exhaust port 16e to prevent an increase in a compression pressure of the gas, thus reducing an operation load of the starter 13. Therefore, the crankshaft 6 can be cranked relatively lightly and swiftly, thereby allowing easy starting of the engine.

When the engine starts and the engine rotational speed Ne exits the starting rotation region a, moment of the centrifugal weight 35 around the pivot 36 due to a centrifugal force Fw overcomes moment of the centrifugal weight 35 around the pivot 36 by the set load Fs1 of the first return spring 43, to cause the centrifugal weight 35 to oscillate radially outward from the contracted position A. Such oscillation is transmitted from the connection piece 35a to the connection protrusion 45c, to rotate the drive ring 45 counterclockwise and move the pin 45b to a position facing a bottom surface 58b of the recessed cam 58 of the decompression cam member 47. Thus, the decompression cam member 47 moves to an inoperative position D by the centrifugal force without interference by the pin 45b, thereby retracting the protruding cam 47a into the base circle of the exhaust cam 26e.

Figure 16:
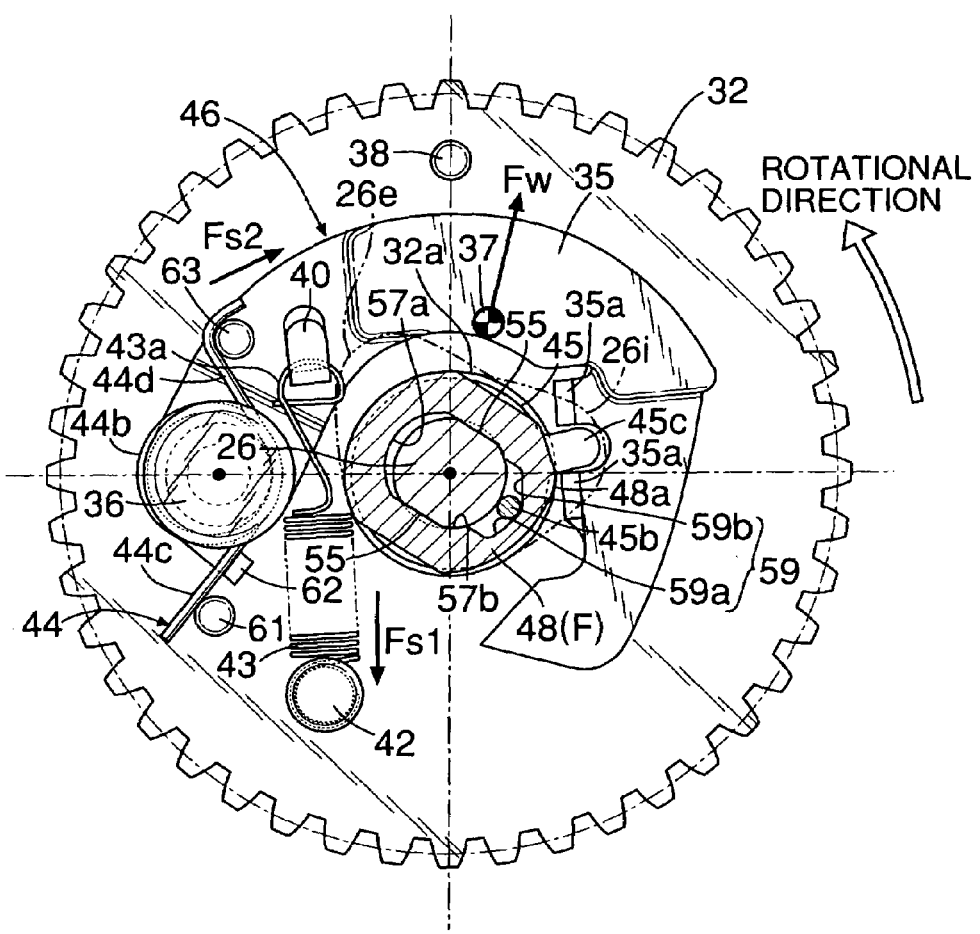
FIG. 16 is a sectional view taken along the line 16–16 in FIG. 11.

During this process, in the exhaust gas recirculation cam member 48, a bottom surface 59a of a recessed cam 59 faces the pin 45b of the drive ring 45 as shown in FIG. 16, and thus the exhaust gas recirculation cam member 48 is held in an inoperative position F by the centrifugal force without interference by the pin 45b, thereby retracting the protruding cam 48a into the base circle of the exhaust cam 26e.

Figure 15:
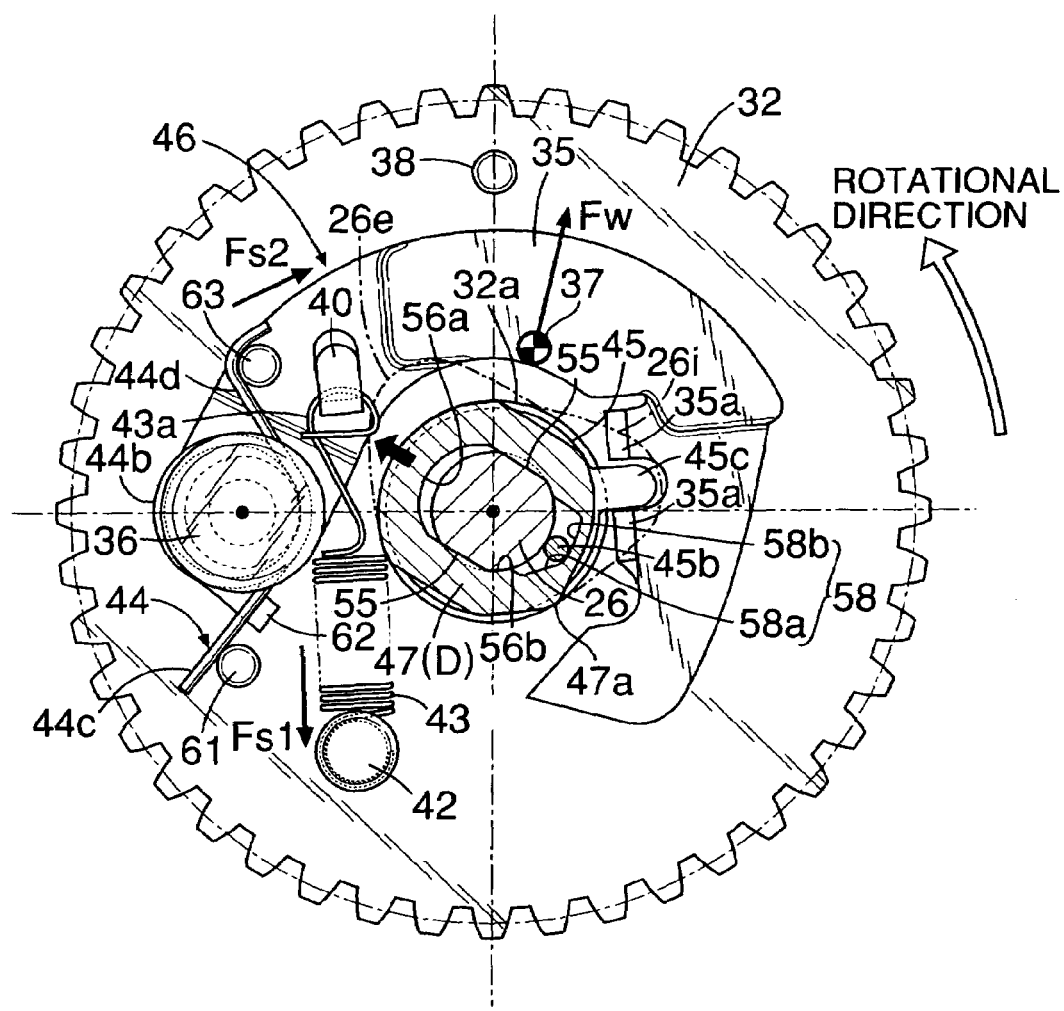
FIG. 15 illustrates an operation corresponding to FIG. 14.

Thus, the exhaust valve 17e is controlled to be opened and closed only depending on the operation of the exhaust cam 26e as usual. Such a state continues in a low speed operation region b of the engine where the engine rotational speed Ne is Ne1 to Ne2 (see FIG. 9). With the movement of the centrifugal weight 35 at about the time when the engine rotational speed Ne reaches Ne2, as shown in FIGS. 15 and 16, the first arm 44c of the second return spring 44 is caught by the stopper pin 61 of the driven gear 32 to further twist the coil portion 44b, and the repulsive force thereof urges the centrifugal weight 35 radially inward in cooperation with the first return spring 43. Thus, after that, the position of the centrifugal weight 35 is determined by a balance between moment of the centrifugal weight 35 around the pivot 36 due to a return force Fs1 of the first return spring 43 and a return force Fs2 of the second return spring 44, and moment of the centrifugal weight 35 around the pivot 36 due to the centrifugal force Fw, so that an oscillation speed of the centrifugal weight 35 according to an increase in the engine rotational speed Ne slows.

Figure 17:
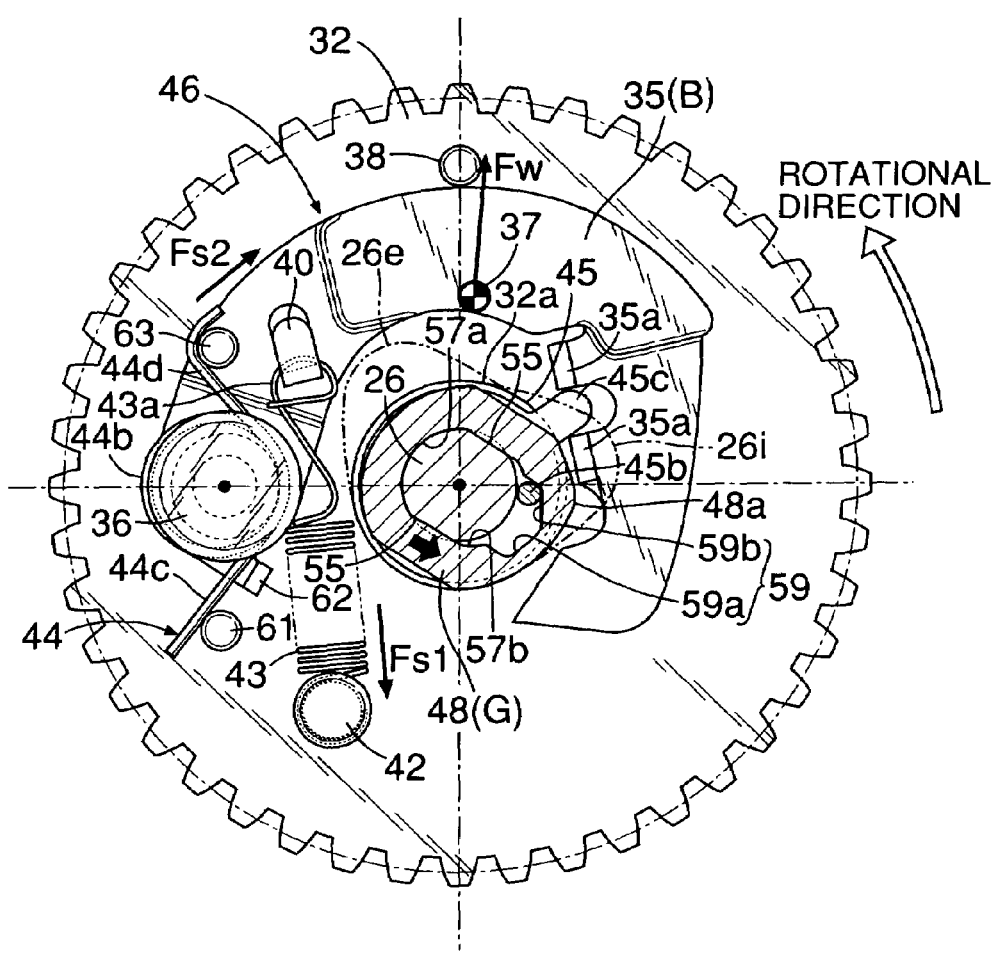
FIG. 17 illustrates an operation corresponding to FIG. 16.

Next, when the engine rotational speed Ne exceeds Ne2 (see FIG. 9) and the internal combustion engine E enters a high speed operation region C, the centrifugal weight 35 finally reaches the extended position B where the centrifugal weight 35 abuts against the stopper 38 on the driven gear 32, and the resultant further counterclockwise rotation of the drive ring 45 causes the pin 45b to press the inclined surface 59b of the recessed cam 59 of the exhaust gas recirculation cam member 48 and move the exhaust gas recirculation cam member 48 to an operative position G against the centrifugal force as shown in FIG. 17. Therefore, the protruding cam 48a of the exhaust gas recirculation cam member 48 protrudes beyond the base circle of the exhaust cam 26e. Thus, in the intake stroke of the piston 7, the protruding cam 48a of the exhaust gas recirculation cam member 48 slightly pushes up the exhaust tappet 27e to slightly open the exhaust valve 17e via the exhaust push rod 28e and the exhaust rocker arm 29e. This causes an exhaust gas remaining in the exhaust port 16e to be drawn into the combustion chamber 15, that is, the exhaust gas is recirculated. The exhaust gas prevents an excessive increase in combustion temperature during combustion of air-fuel mixture in a downstream expansion stroke to reduce a NOx concentration in the exhaust gas, reduce a HC concentration, and improve fuel consumption.

As described above, also in the second embodiment, the decompression cam member 47 and the exhaust gas recirculation cam member 48 can be successively operated via the common drive ring 45 by the common centrifugal weight 35 that oscillates according to the increase in the engine rotational speed Ne as well as the first and second return springs 43 and 44 that repel the oscillation. Further, a timing of abutment of the first arm 44c of the second return spring 44 against the stopper pin 61 can be selected to freely set an operation region of the exhaust gas recirculation cam member 48 regardless of an operation region of the decompression cam member 47. Thus, merely adding a simple structure to the valve operating system 20 provides an inexpensive valve operating system 20 having a decompression function and an exhaust gas recirculation function of desired properties without mutual interference.

Next, a third embodiment of the invention shown in FIGS. 18 to 24 will be described.

Figure 18:
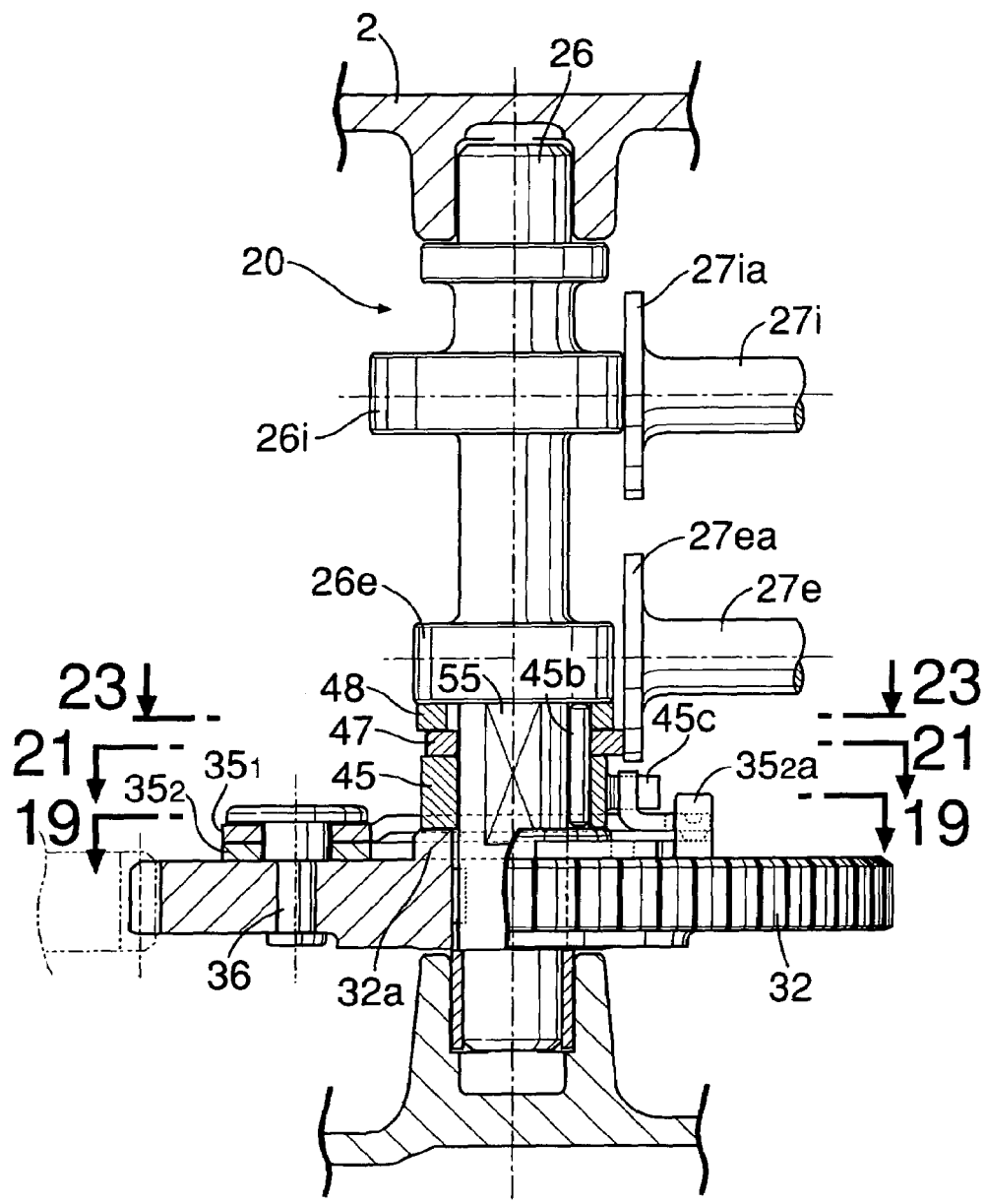
FIG. 18 is a vertical sectional side view of potions around a cam shaft in a valve operating system according to a third embodiment of the present invention.
Figure 19:
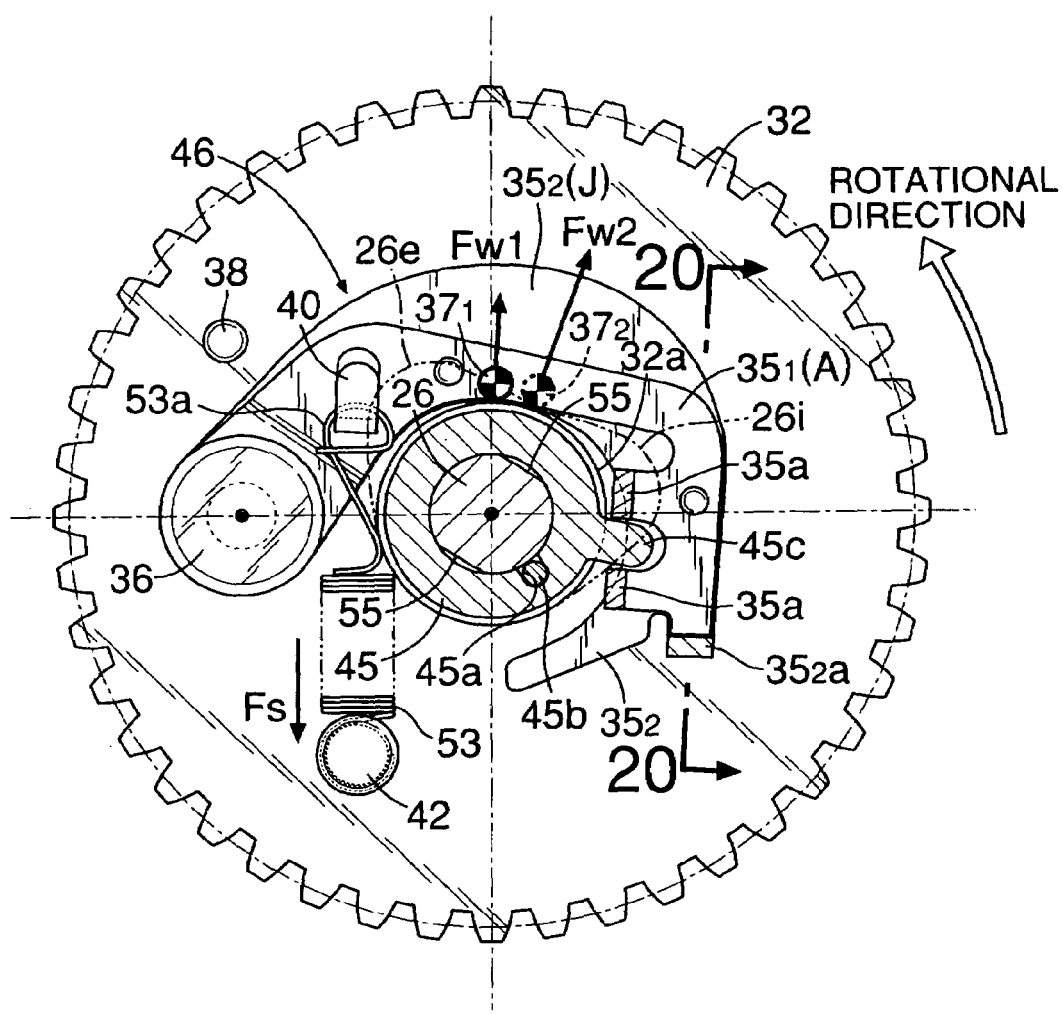
FIG. 19 is a sectional view taken along the line 19—19 in FIG. 18.
Figure 20:
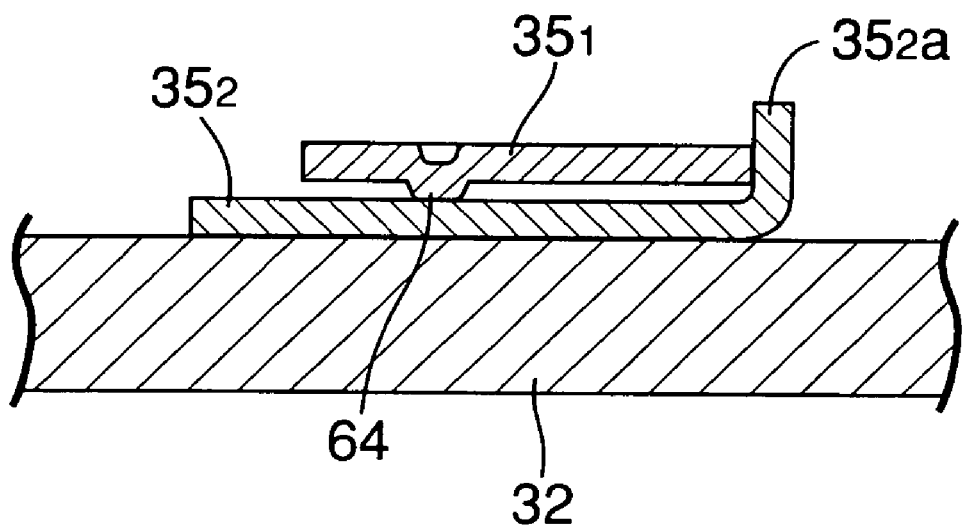
FIG. 20 is a sectional view taken along the line 20—20 in FIG. 19.

As shown in FIGS. 18 and 19, a centrifugal weight of a centrifugal mechanism 46 includes a first centrifugal weight $35_1$ and a second centrifugal weight $35_2$ supported on a driven gear 32 via a common pivot 36. The first centrifugal weight $35_1$ has a U-shaped substantially the same as that of the centrifugal weight 35 in the first embodiment, and has a center of gravity 37, in a U-shaped bending portion thereof. The first centrifugal weight $35_1$ can oscillate around the pivot 36 between a contracted position A where the U-shaped bending portion abuts against a hub 32a of the driven gear 32 and an extended position B where an outer side surface of the U-shaped bending portion abuts against a stopper 38 protruding on a side surface of the driven gear 32. As in the centrifugal weight 35 in the first embodiment, a movable end 53a of a return spring 53 that always urges the first centrifugal weight $35_1$ radially inward with a predetermined set load Fs is connected to a movable connection 40 of the first centrifugal weight $35_1$ and a pair of connection pieces 35a and 35a that hold a connection protrusion 45c of a drive ring 45 therebetween is provided on the first centrifugal weight $35_1$.

The second centrifugal weight $35_2$ is bent into a hook shape so as to surround a half circumference of a camshaft 26, and has, in a middle portion thereof, a center of gravity $37_2$ close to the center of gravity $37_1$ of the first centrifugal weight $35_1$. The second centrifugal weight $35_2$ can oscillate around the pivot 36 between a contracted position J (see FIG. 19) where the middle portion abuts against an outer peripheral surface of the hub 32a of the driven gear 32 and an extended position K (see FIG. 24) where a tip end abuts against the outer peripheral surface of the hub 32a. An oscillation angle between the contracted position J and the extended position K of the second centrifugal weight $35_2$ is set smaller than an oscillation angle between the contracted position A and the extended position B of the first centrifugal weight $35_1$. The second centrifugal weight $35_2$ has an abutment portion $35_2a$ (see FIGS. 19 and 20) that abuts against a tip end of the first centrifugal weight $35_1$ when the second centrifugal weight $35_2$ oscillates between the contracted position J and the extended position K. In order to smoothen relative oscillation of the first centrifugal weight $35_1$ and the second centrifugal weight $35_2$, the first centrifugal weight $35_1$ has one or more protrusions 64 (see FIG. 20) that slidably comes into contact with a side surface of the second centrifugal weight $35_2$.

Because other components are the same as those in the first embodiment, components in FIGS. 18 to 24 corresponding to those in the first embodiment are denoted by the same reference numerals, and descriptions thereof is omitted.

Figure 21:
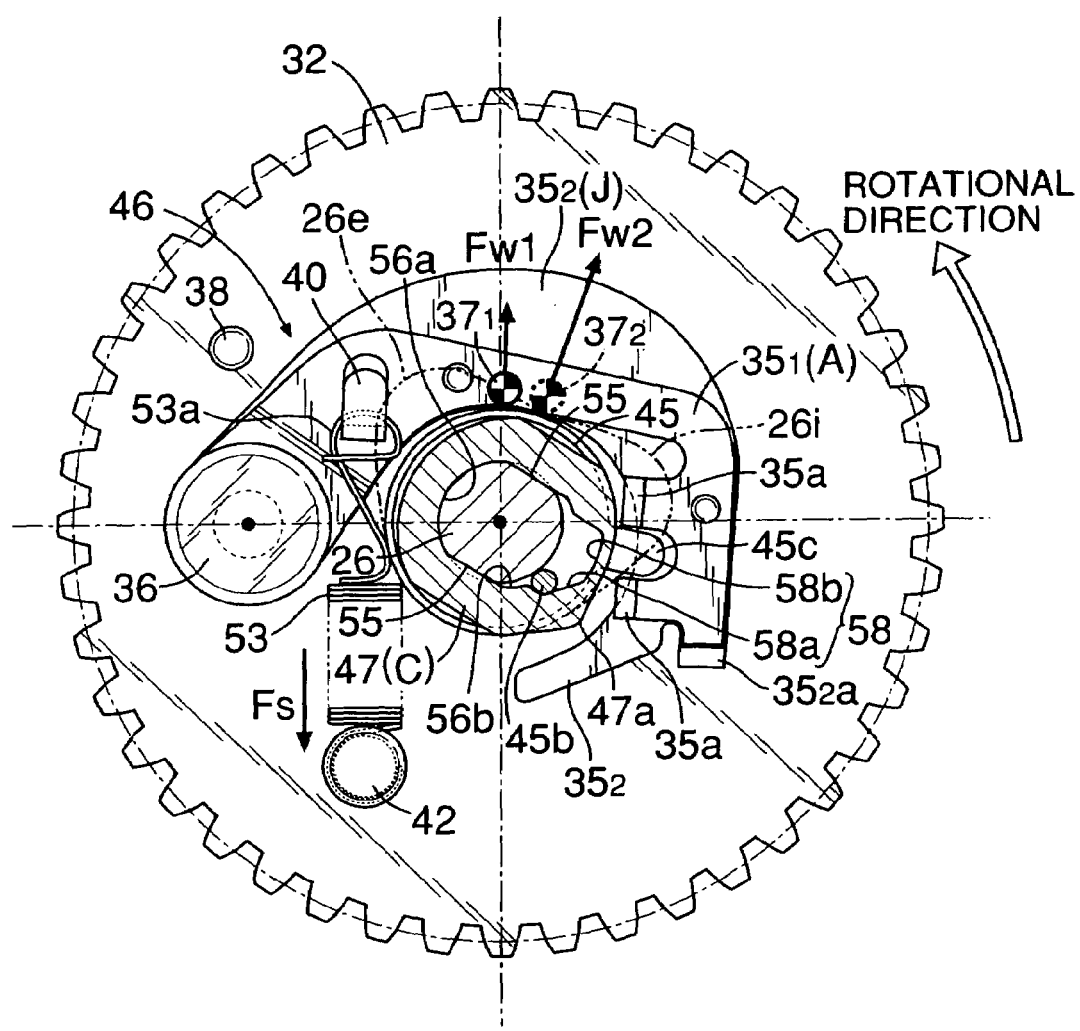
FIG. 21 is a sectional view taken along the line 21—21 in FIG. 18.

The first centrifugal weight $35_1$ is held in the contracted position A by the set load Fs of the return spring 53 as shown in FIGS. 19 and 21 in a starting rotation region a (see FIG. 9) of the engine from the engine rotational speed Ne of zero to a predetermined rotational speed Ne1 lower than an idling rotational speed. Thus, as in the first embodiment, the first centrifugal weight $35_1$ causes a pin 45b of the drive ring 45 positioned via the connection protrusion 45c and the connection pieces 35a and 35a that engage each other, to press an inclined surface 58a of a recessed cam 58 of a decompression cam member 47, and thus the decompression cam member 47 is held in an operative position C where a protruding cam 47a protrudes outward beyond a base circle of an exhaust cam 26e. Then, if a recoil starter 13 is operated to start the internal combustion engine E, a crankshaft 6 is cranked from the starter 13 via a starting cylinder shaft 12, and at the same time, a camshaft 26 is driven via a timing transmission device 25. Thus, in a compression stroke of a piston 7, the protruding cam 47a of the decompression cam member 47 slightly pushes up an exhaust tappet 27e to slightly open an exhaust valve 17e via an exhaust push rod 28e and an exhaust rocker arm 29e. The timing at this time is shown in FIG. 10. This causes part of a compression gas in a cylinder bore 3a to be discharged through an exhaust port 16e, thereby preventing an increase in a compression pressure of the gas to reduce an operation load of the starter 13. Therefore, the crankshaft 6 can be cranked relatively lightly and swiftly, thereby allowing easy starting of the engine.

During this process, the first centrifugal weight $35_1$ presses the abutment portion $35_2a$ of the second centrifugal weight $35_2$ with the set load Fs of the return spring 53, to also hold the second centrifugal weight $35_2$ in the contracted position J.

Figure 22:
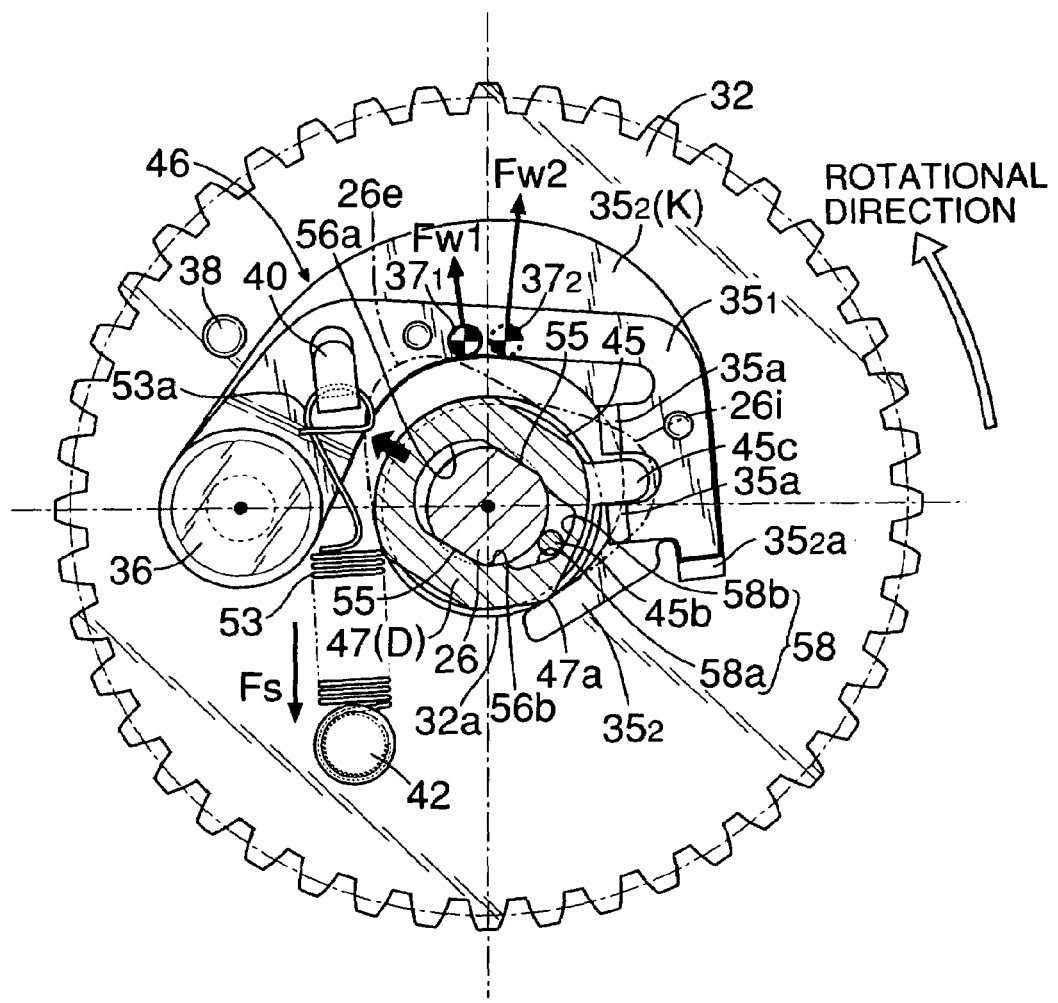
FIG. 22 illustrates an operation corresponding to FIG. 21.

When the engine starts and the engine rotational speed Ne exits the starting rotation region a, as shown in FIG. 22, the sum of moment of the first centrifugal weight $35_1$ around the pivot 36 due to a centrifugal force Fw1 and moment of the second centrifugal weight $35_2$ around the pivot 36 due to a centrifugal force Fw2 overcomes moment of both the centrifugal weights $35_1$ and $35_2$ around the pivot 36 due to the set load Fs of the return spring 53, to cause the centrifugal weights $35_1$ and $35_2$ to oscillate radially outward from the contracted positions A and K. Such oscillation of the first centrifugal weight $35_1$ is transmitted from the connection piece 35a to the connection protrusion 45c, to rotate the drive ring 45 counterclockwise and move the pin 45b to a position facing a bottom surface 58b of the recessed cam 58 of the decompression cam member 47. Thus, the decompression cam member 47 moves to an inoperative position D by the centrifugal force without interference by the pin 45b, thereby retracting the protruding cam 47a into the base circle of the exhaust cam 26e.

Figure 23:
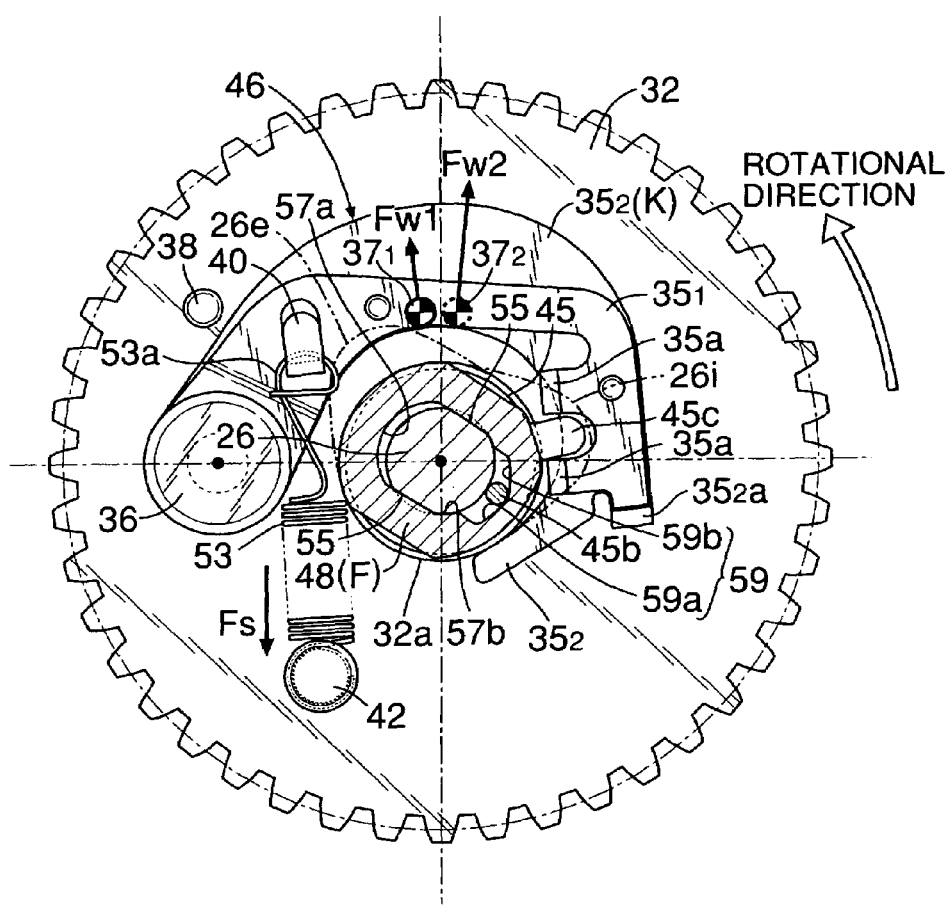
FIG. 23 is a sectional view taken along the line 23—23 in FIG. 18.
Figure 24:
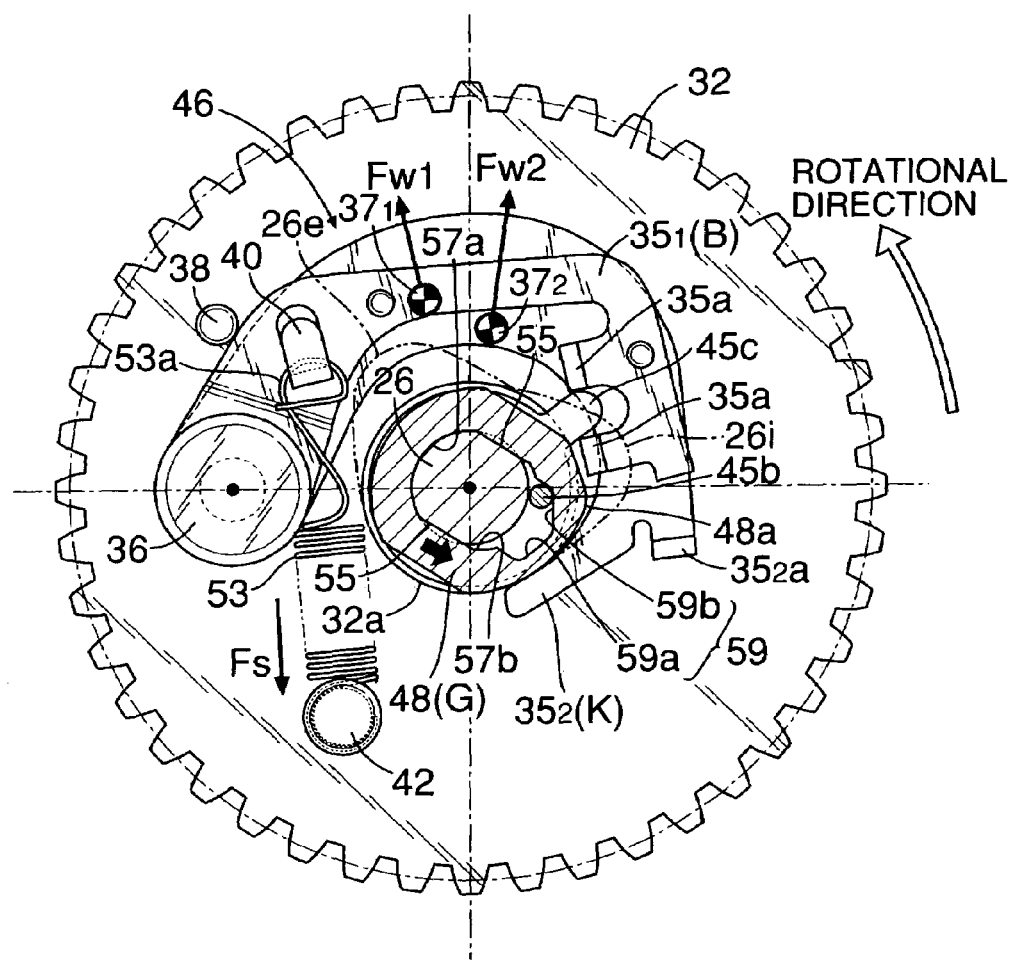
FIG. 24 illustrates an operation corresponding to FIG. 23.

During this process, in the exhaust gas recirculation cam member 48, a bottom surface 59a of a recessed cam 59 faces the pin 45b of the drive ring 45 as shown in FIG. 23, and thus the exhaust gas recirculation cam member 48 is held in an inoperative position F by the centrifugal force without interference by the pin 45b, thereby retracting the protruding cam 48a into the base circle of the exhaust cam 26e.

Thus, the exhaust valve 17e is controlled to be opened and closed only depending on the operation of the exhaust cam 26e as usual. Such a state continues in a low speed operation region b of the engine where the engine rotational speed Ne is Ne1 to Ne2. At about the time when the engine rotational speed Ne reaches Ne2, as shown in FIGS. 22 and 23, the second centrifugal weight $35_2$ reaches the extended position K where the tip end of the second centrifugal weight $35_2$ abuts against the outer peripheral surface of the hub 32a, thereby preventing further outward oscillation. As a result, the centrifugal force Fw2 of the second centrifugal weight $35_2$ stops resisting the return spring 53. Thus, the position of the first centrifugal weight $35_1$ is determined by a balance between the moment of the first centrifugal weight $35_1$ around the pivot 36 due to the centrifugal force Fw1, and the moment of the first centrifugal weight $35_1$ around the pivot 36 due to a return force Fs of the return spring 53. After that, an oscillation speed of the first centrifugal weight $35_1$ according to an increase in the engine rotational speed Ne slows.

Then, when the engine rotational speed Ne exceeds Ne2 and the internal combustion engine E enters a high speed operation region C, the first centrifugal weight $35_1$ finally reaches the extended position B where the first centrifugal weight $35_1$ abuts against the stopper 38 on the driven gear 32, and the resultant further counterclockwise rotation of the drive ring 45 causes the pin 45b to press the inclined surface 59b of the recessed cam 59 of the exhaust gas recirculation cam member 48 and move the exhaust gas recirculation cam member 48 to an operative position G against the centrifugal force. Therefore, the protruding cam 48a of the exhaust gas recirculation cam member 48 protrudes beyond the base circle of the exhaust cam 26e. Thus, in an intake stroke of the piston 7, the protruding cam 48a of the exhaust gas recirculation cam member 48 slightly pushes up the exhaust tappet 27e, to slightly open the exhaust valve 17e via the exhaust push rod 28e and the exhaust rocker arm 29e. This causes an exhaust gas remaining in the exhaust port 16e to be drawn into the combustion chamber 15, that is, the exhaust gas is recirculated. The exhaust gas prevents an excessive increase in combustion temperature during combustion of air-fuel mixture in a later expansion stroke to reduce a NOx concentration in the exhaust gas, reduce a HC concentration, and improve fuel consumption.

As described above, in the third embodiment, the decompression cam member 47 and the exhaust gas recirculation cam member 48 can be successively operated via the common drive ring 45 by the first centrifugal weight $35_1$ and the second centrifugal weight $35_2$ that oscillate according to the increase in the engine rotational speed Ne and one return spring 53 that repels the oscillation. Further, a timing of canceling the operation of the second centrifugal weight $35_2$ can be selected to freely set an operation region of the exhaust gas recirculation cam member 48 regardless of an operation region of the decompression cam member 47. Thus, merely adding a simple structure to the valve operating system 20 provides an inexpensive valve operating system 20 having a decompression function and an exhaust gas recirculation function of desired properties without mutual interference.

The invention is not limited to the above described embodiments, and various modifications may be made without departing from the subject matter of the invention. For example, in the first and the second embodiments, the first return spring 43 and the second return spring 44 may be replaced by one spring with a nonlinear spring constant.

What is claimed is:

1. A valve operating system for an internal combustion engine comprising:
    a camshaft interlocked with a crankshaft; and
    an intake cam follower member and an exhaust cam follower member that follow an intake cam and an exhaust cam formed on the camshaft to open and close an intake valve and an exhaust valve, respectively,
    wherein the valve operating system further comprises:
    a decompression cam member that is provided on the camshaft, and moves between an operative position C where the exhaust cam follower member is operated in an opening direction of the exhaust valve in a compression stroke of the engine and an inoperative position D where the exhaust cam follower member is released;
    an exhaust gas recirculation cam member that is provided on the camshaft, and moves between an inoperative position F where the exhaust cam follower member is released and an operative position G where the exhaust cam follower member is operated in an opening direction of the exhaust valve in an intake stroke of the engine; and
    a common centrifugal mechanism that is driven by the camshaft to operate the decompression cam member to the operative position C in a starting rotation region of the engine and to the inoperative position D after the starting, and operate the exhaust gas recirculation cam member to the inoperative position F in a low speed operation region of the engine and to the operative position G in a high speed operation region.

2. The valve operating system for an internal combustion engine according to claim 1, wherein the centrifugal mechanism includes:
    a centrifugal weight that is radially oscillably axis-supported on a support member secured to the camshaft; a return spring that urges the centrifugal weight radially inward; and a common drive member that operates according to oscillation of the centrifugal weight, and engages cams provided on the decompression cam member and the exhaust gas recirculation cam member to drive the decompression cam member to the operative position C in the starting rotation region of the engine and to the inoperative position D after the starting, and drive the exhaust gas recirculation cam member to the inoperative position F in the low speed operation region of the engine and to the operative position G in the high speed operation region.

3. The valve operating system for an internal combustion engine according to claim 2, wherein the return spring includes: a first return spring that always exerts a radially inward urging force on the centrifugal weight; and a second return spring that exerts a radially inward repulsive force on the centrifugal weight after the centrifugal weight oscillates radially outward through a predetermined angle or more.

4. The valve operating system for an internal combustion engine according to claim 2, wherein the centrifugal weight includes: a first centrifugal weight that always exerts a centrifugal force against an urging force of the return spring during rotation of the camshaft; and a second centrifugal weight that is integrated with the first centrifugal weight to exert the centrifugal force against the urging force of the return spring until the first centrifugal weight oscillates radially outward through a predetermined angle, but is separated from the first centrifugal weight to cancel the centrifugal force against the urging force of the return spring after the first centrifugal weight oscillates radially outward through the predetermined angle or more.

* * * * *